United States Patent
Sawahashi et al.

(10) Patent No.: US 7,324,434 B2
(45) Date of Patent: Jan. 29, 2008

(54) RADIO TRANSMISSION SYSTEM AND METHOD, AND TRANSMITTER APPARATUS AND RECEIVER APPARATUS USED IN THE RADIO TRANSMISSION SYSTEM

(75) Inventors: Mamoru Sawahashi, Yokohama (JP); Hiroyuki Atarashi, Yokohama (JP); Sadayuki Abeta, Yokosuka (JP); Noriyuki Maeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1253 days.

(21) Appl. No.: 10/231,284

(22) Filed: Aug. 30, 2002

(65) Prior Publication Data

US 2003/0053413 A1 Mar. 20, 2003

(30) Foreign Application Priority Data

Aug. 30, 2001 (JP) ............................. P2001-262215

(51) Int. Cl.
*H04J 11/00* (2006.01)
(52) U.S. Cl. ........................................ 370/208; 370/342
(58) Field of Classification Search .................... None
See application file for complete search history.

(56) References Cited

U.S. PATENT DOCUMENTS

| | | | | |
|---|---|---|---|---|
| 6,535,502 | B1* | 3/2003 | Brink | 370/345 |
| 6,628,667 | B1* | 9/2003 | Murai et al. | 370/468 |
| 6,678,314 | B2* | 1/2004 | Juntti et al. | 375/150 |
| 6,768,728 | B1* | 7/2004 | Kim et al. | 370/342 |
| 6,870,826 | B1 | 3/2005 | Ishizu | |
| 2002/0191569 | A1* | 12/2002 | Sung et al. | 370/335 |
| 2003/0026200 | A1* | 2/2003 | Fu et al. | 370/208 |
| 2003/0081538 | A1* | 5/2003 | Walton et al. | 370/206 |

(Continued)

FOREIGN PATENT DOCUMENTS

EP 1 133 079 A1 9/2001

(Continued)

OTHER PUBLICATIONS

Performance of Broadband MC-CDMA Packet Wireless Access Using Multi-level Modulation and Hybrid ARQ in Forward Link, Hiroyuki Atarashi et al, Speeches and Papers for 2000 Symposium of Communication Society, The Institute of Electronics, Information and Communication Engineers, The Institute of Electronics, Information and Communication Engineers, Sep. 7, 2000, Communication 1, pp. 529 and 530, Fig. 1(a).

(Continued)

*Primary Examiner*—Phirin Sam
(74) *Attorney, Agent, or Firm*—Oblon, Spivak, McClelland, Maier & Neustadt, P.C.

(57) ABSTRACT

A radio transmission system is configured to, on the occasion of radio transmission of information between a transmitter and a receiver, perform the radio transmission of information using an orthogonal frequency and code division multiplexing transmission scheme of parallelly transmitting identical information by a plurality of sub-carriers. The radio transmission system has a spreading factor variable control transmitting device for parallelly converting information channel-coded at the transmitter, according to symbols transmitted simultaneously, and for spreading a sequence of parallelized symbols in at least one of a frequency direction and a time direction by a spreading code sequence of a designated spreading factor.

35 Claims, 19 Drawing Sheets

U.S. PATENT DOCUMENTS

2004/0240401 A1* 12/2004 Willenegger et al. ....... 370/294

FOREIGN PATENT DOCUMENTS

| JP | 07-264145 | 10/1995 |
|---|---|---|
| JP | 7-264145 | 10/1995 |
| JP | 10-145282 | 5/1998 |
| JP | 2000-295198 | 10/2000 |
| JP | 2000-332724 | 11/2000 |
| JP | 2001-069075 | 3/2001 |
| JP | 2001-69075 | 3/2001 |
| JP | 2001-168788 | 6/2001 |
| KR | 2001-0082253 | 8/2001 |

OTHER PUBLICATIONS

Multi-carrier CDMA System Performing Time and Frequency Spreading, (Hiroyasu Sano et al), Speeches and Papers for 2000 Symposium of Communication Society, The Institute of Electronics, Information and Communication Engineers, The Institute of Electronics, Information and Communication Engineers, Sep. 7, 2000, Communication 1, p. 378, Fig. 1.

Hiroyuki Atarashi, et al., "Performance of Broadband MC-CDMA Packet Wireless Access Using Multi-level Modulation and Hybrid ARQ in Forward Link", Proceedings of the 2000 Communications Society Conference of IEICE, vol. 1, Sep. 7, 2000, pp. 529-530 with Cover page.

Hiroyasu Sano, et al., "A Multicarrier CDMA Scheme with Spreading in Time and Frequency Domains", Proceedings of the 2000 Communications Society Conference of IEICE, vol. 1, Sep. 7, 2000, p. 378 with cover page.

Mamoru Sawahashi, et al., "Broadband TD-OFCDM Packet Transmission using Variable Spreading Factor", Proceedings of the 2001 IEICE General Conference, Communication 1, Mar. 3, 2001, p. 495 with cover page and English translation.

Hiroyuki Atarashi, et al., "Performance of Broadband OFCDM Packet Wireless Access Employing Variable Spreading Factor", Proceedings of the 2001 Communications Society Conference of IEICE, vol. 1, Aug. 29, 2001, p. 333 with cover page and English translation.

Sadayuki Abeta, et al., "Coherent Multicarrier/DS-CDMA and MC-CDMA for Broadband Packet Wireless Access", VTC2000-Spring, 2000 IEEE 51st Vehicular Technology Conference Proceedings, vol. 3, May 15-18, 2000, pp. 1918-1922.

Hiroyuki Atarashi, et al., "Comparison of Broadband Packet Wireless Access", Technical Report of IEICE, The Institute of Electronics, Information and Communication Engineers, RCS2000-136, pp. 59-66 (with English abstract).

Hiroyuki Atarashi, et al. "Broadband Packet Wireless Access Appropriate for High-speed and High-capacity Throughput", IEEE VTC2001-Spring, May 6-9, 2001, 5 pages.

* cited by examiner

SINGLE-CELL ISOLATED CELL
ENMVIRONMENT IN OFDM (3-CELL REUSE)

MULTI-CELL ENVIRONMENT
IN OFCDM (1-CELL REUSE)

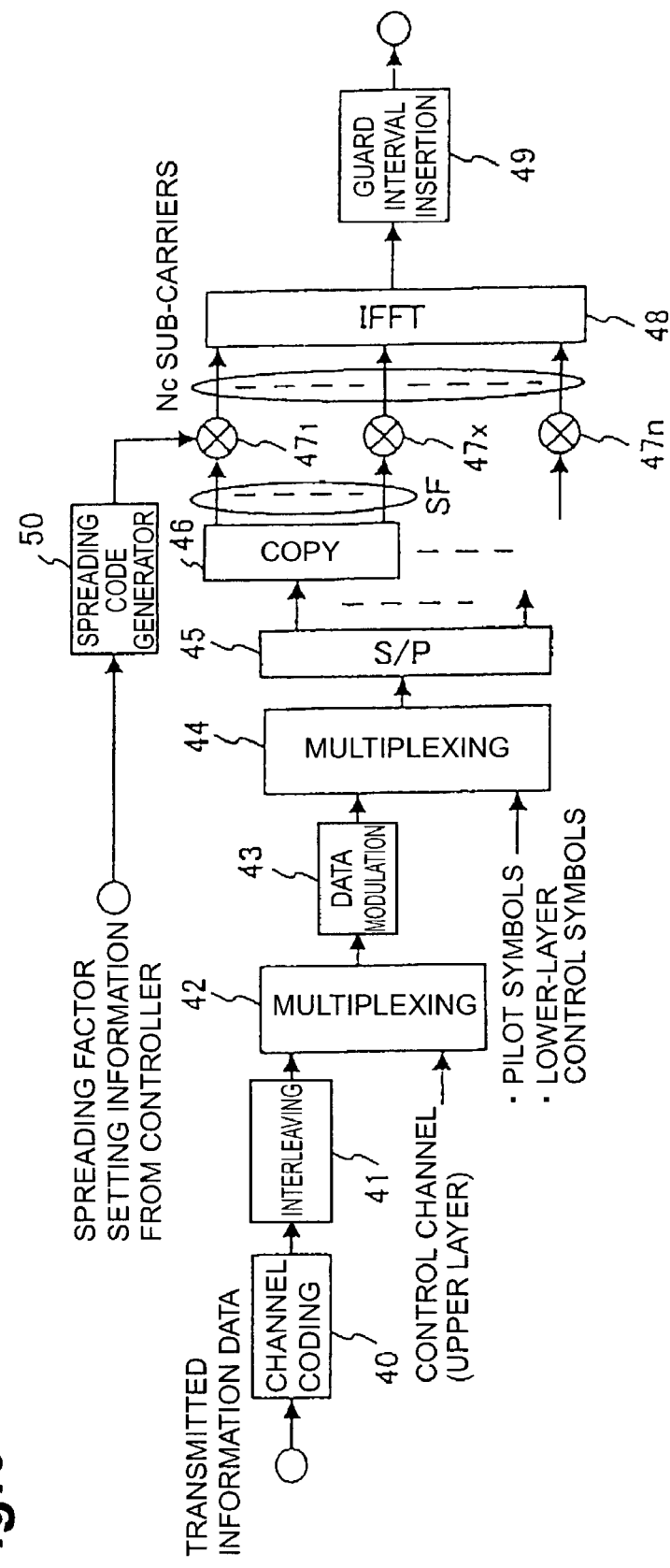

Fig.11

| Bandwidth | 80MHz |
|---|---|
| Number of sub-carriers Nc | 512 |
| Spreading factor SF | 32(TD-OFCDM), 1(TD-OFDM) |
| Spreading sequence — Channelization | Walsh-Hadamard |
| Spreading sequence — Scrambling | Random |
| Packet length | 64 OFDM symbols (Nd = 60, Nn = 4) |
| Data modulation/Spreading | QPSK/QPSK |
| Channel coding/decoding | Convolutional coding (R=1/2, K=9)/ Soft decision Viterbi decoding |
| Channel model | Distant path-loss + Shadowing + Multipath fading |
| Maximum Doppler frequency | 80Hz |

M=3, L-8 (24-PATH) TRIANGULAR DISTRIBUTION MODEL

18-PATH EXPONENTIAL ATTENUATION MODEL

RADIO TRANSMISSION SYSTEM AND METHOD, AND TRANSMITTER APPARATUS AND RECEIVER APPARATUS USED IN THE RADIO TRANSMISSION SYSTEM

BACKGROUND OF THE INVENTION

1. Field of the Invention

The present invention relates to a radio transmission system and method and, more particularly, to a radio transmission system and method configured to vary spreading factors for information symbol sequences according to cell environments or propagation environments, using the orthogonal frequency and code division multiplexing scheme.

The present invention also relates to transmitter apparatus used in such a radio transmission system.

The present invention further relates to receiver apparatus used in such a radio transmission system.

2. Related Background Art

The W (Wideband)-CDMA (Code Division Multiple Access) system was adopted as a radio access scheme in the third generation mobile telecommunication (IMT-2000: International Mobile Telecommunication 2000), and it was clarified by experiment that it was feasible to implement high-quality 2 Mbps transmission of less than average $BER=10^{-6}$ in the 5 MHz band by means of this W-CDMA radio interface.

With recent progress in broadbandization of Internet services through wired networks, it is, however, considered that it is also necessary to realize high-speed mobile Internet access in cellular environments of mobile telecommunications. Since the data traffic is expected to increase because of downloading of images and large-volume files from Web sites and various databases, particularly, through downlinks by which data is transmitted from radio base stations and received at mobile stations, the essential is packet transmission suitable for up-down asymmetric communication and burst transmission.

Under such circumstances, proposals have been made on HDR (High Data Rate) specialized for data communication on the basis of the IS-95 radio interface and realizing high-speed packet transmission at the maximum information transmission rate of 2.4 Mbps in the 1.25 MHz band, and 3GPP ($3^{rd}$ Generation Partnership Project) also worked on the scheme of expanding the W-CDMA radio interface to realize high-speed packet transmission at the maximum information transmission rate of approximately 10 Mbps in the 5 MHz band (HSPDA: High Speed Down Link Packet Access). These schemes utilize the so-called adaptive modulation/demodulation technology of changing modulation/demodulation methods according to channel conditions, by which it becomes feasible to implement information transmission rates over 2 Mbps in good channel condition.

SUMMARY OF THE INVENTION

For the next-generation mobile telecommunications (the fourth generation mobile telecommunications) after IMT-2000, it is necessary to substantiate cellular systems that permit wide communication coverage at much higher information transmission rates (throughput), i.e., specifically, the maximum throughput of 100 Mbps or higher for downlinks and the maximum throughput of 20 Mbps or higher for uplinks in consideration of the asymmetry of up and down links of data traffic in the current cellular systems. However, approaches based on the aforementioned expansion of existing radio interfaces (HDR and HSPDA) have their limits to increase in the information transmission rates and it is hard to realize the maximum information transmission rate of about 100 Mbps. For example, supposing the radio bandwidth of 5 MHz allocated to W-CDMA (DS-CDMA base) is broadbandized to approximately 50-100 MHz, the broadbandization, i.e., higher chip rates will permit improvement in resolution of paths and result in separation into an extremely large number of paths in a small signal power per path. Therefore, this will cause increase of Multi-path Interference (MPI) and degradation of channel estimation accuracy, so as to cancel out the Rake time diversity effect, which will end in increasing the transmission power for realizing the required reception quality at the required information transmission rates and decreasing link capacity. Accordingly, the radio access schemes based on DS-CDMA are not suitable for high-speed and large-capacity packet transmission in the broadband of 50-100 MHz.

The orthogonal frequency division multiplexing (OFDM) scheme used in digital terrestrial broadcasting, wireless LAN, and others, can decrease the influence of MPI in such a way that the symbol period of each sub-carrier is set adequately long within the range where it is sufficiently smaller than delay times of multiple paths, i.e., the symbol rate is lowered and that a guard interval is inserted into each symbol. Therefore, in comparison with the aforementioned radio access scheme using DS-CDMA, OFDM is able to keep down the degradation of characteristics due to MPI in connection with the broadbandization and is thus suitable for high-speed signal transmission in the bandwidth of 50-100 MHz or higher.

In the OFDM, however, co-channel interference does not allow use of a common carrier frequency in adjacent cells and frequency reuse of cells is necessary. In the OFDM system, therefore, a frequency band that can be used per cell is a bandwidth obtained by dividing the entire frequency band of the system by the cell frequency reuse (cluster size), and this decreases efficiency of utilization of frequency. This OFDM system requires sophisticated Dynamic Channel Allocation (DCA) for realization of the frequency reuse of one cell and control becomes very complicated. In addition, the cell frequency reuse is essential for common control channels such as broadcast channels, paging channels, etc., which are constantly transmitted to communicating users in cells.

On the other hand, in the case of OFCDM (Orthogonal Frequency and Code Division Multiplexing) based on multi-carrier CDMA for multi-carrier transmission of signals spread on the frequency axis, the lower symbol rate is achieved using a number of sub-carriers, so that the influence of MPI is reduced. For this reason, it can implement larger capacity than the radio access schemes based on DS-CDMA, as is reported in Document 1 [S. Abeta, et al., IEEE VTC2000-Spring, pp. 1918-1922] and Document 2 [Hiroyuki Atarashi, Sadayuki Abeta, and Mamoru Sawahashi, IEICE Technical Reports RCS-2000-136, October 2000]. However, this OFCDM permitted increase in system capacity in the case of multi-cell systems like cellular systems, as compared with OFDM, but had the problem that it was not feasible to implement higher capacity in the case of isolated cell systems like wireless LAN and office environments, as compared with OFDM involving no spreading.

A first object of the present invention is thus to provide a radio transmission system configured to vary spreading factors for transmitted information through use of OFCDM and thereby enable broadband packet transmission in wide cell coverage.

A second object of the present invention is to provide transmitter apparatus used in such a radio transmission system.

A third object of the present invention is to provide receiver apparatus used in such a radio transmission system.

A radio transmission system according to the present invention is a radio transmission system configured to, on the occasion of radio transmission of information between a transmitter and a receiver, perform the radio transmission of information using an orthogonal frequency and code division multiplexing transmission scheme of parallelly transmitting identical information by a plurality of sub-carriers, wherein the transmitter comprises converting means for parallelly converting channel-coded information in accordance with symbols transmitted simultaneously; and spreading means for spreading a sequence of parallelized symbols in at least one of a frequency direction and a time direction by a spreading code sequence of a spreading factor determined based on a plurality of changeable spreading factors.

This radio transmission system can be made to act as an OFCDM or OFDM system by changing the radio parameter of the transmitter's and receiver's spreading factor in the same radio access scheme. For this reason, it becomes feasible to provide flexible use of the two schemes of OFCDM and OFDM and to provide a radio access scheme capable of realizing large capacity with high frequency utilization efficiency (the number of communicating users capable of meeting the required reception quality per cell), independent of cell configurations and propagation environments.

In the radio transmission system of the present invention, the spreading means is preferably configured to spreading a sequence of parallelized symbols in both a frequency direction and a time direction by a spreading code sequence of a spreading factor determined based on a plurality of changeable spreading factors.

In the radio transmission system of the present invention, the transmitter is preferably configured to comprise a spreading factor determining means for obtaining a propagation environment indicating a condition of a propagation path between the transmitter and the receiver and determining the spreading factor according to the propagation environment.

In the radio transmission system of this configuration, the propagation environment, which indicates the condition of the propagation path between the transmitter and the receiver, is first obtained and the spreading factor is then varied according to the propagation environment. For example, the variation of the spreading factor is carried out in such a way that the spreading factor is set at a value not less than 1 for a propagation environment preferring operation in OFCDM or that the spreading factor is set at 1 for a propagation environment preferring operation in OFDM. As a result, the radio transmission system of the present invention permits selection (changeover) of the access scheme (OFCDM scheme or OFDM scheme) suitable for a propagation environment.

In the radio transmission system of the present invention, the spreading factor determining means is preferably configured to obtain a delay spread indicating a propagation delay property and use the delay spread as the foregoing propagation environment.

Particularly, in the multi-carrier schemes like OFCDM and OFDM, the delay spread indicating delays of multipaths largely affects the behavior of frequency selective fading in the band, so as to affect the reception characteristics. By using the radio transmission system of the above configuration, it is, however, feasible to realize the OFCDM scheme capable of adaptively setting the spreading factor according to the delay spread of propagation paths which can affect the reception characteristics.

In the radio transmission system of the present invention, the transmitter is also preferably configured to comprise second spreading factor determining means for determining the first spreading factor on the basis of a command from outside.

The radio transmission system of this configuration is able to provide the spreading factor to be set at the transmitter, according to contents of control information included in a control signal from outside, e.g., from the receiver (e.g., a mobile station) or a network.

In the radio transmission system of the present invention, the second spreading factor determining means is preferably configured to determine the first spreading factor according to either information indicating a cell configuration or information designating a spreading factor, included in control information representing the command from outside.

In the radio transmission system of this configuration, the control information sent from the receiver, e.g., from a mobile station includes the information for designating the spreading factor. Since the mobile station determines the spreading factor to be set at the transmitter, based on a propagation situation of a downlink (the delay profile), and notifies the information designating the spreading factor, to the transmitter by the control information, it is feasible to perform adaptive control of the spreading factor of OFCDM in the downlink.

In the radio transmission system of the present invention, control information sent from a network station includes information indicating a cell environment. This information on the cell environment includes information for letting the transmitter operate in a multi-cell environment (a cellular environment) or information for letting the transmitter operate in a single-cell environment (a closed space environment like wireless LAN or the like). Accordingly, because the spreading factor can be varied based on the cell information, it is feasible as a result to realize the adaptive control of the spreading factor of OFCDM in the downlink.

In the radio transmission system of the present invention, the receiver is preferably configured to comprise spreading factor control receiving means for separating a received signal at the receiver, into at least one of sub-carriers and time-axial symbols and integrating coherently at least one of sub-carriers and time-axial symbols the number of which is equivalent to the first spreading factor determined based on the plurality of changeable spreading factors, using a channel estimation value and a specific spreading code sequence.

In the radio transmission system of this configuration, the receiver despreads in phase at least one of the sub-carriers and the time-axial symbols the number of which is equivalent to the spreading factor designated, using the channel estimation value and the specific spreading code sequence, so as to be able to operate in OFCDM or operate in OFDM.

In the radio transmission system of the present invention, the receiver is preferably configured to comprise spreading factor control receiving means for separating a received signal at the receiver, into both sub-carriers and time-axial symbols and integrating coherently both sub-carriers and time-axial symbols the number of which is equivalent to the first spreading factor determined based on the plurality of changeable spreading factors, using a channel estimation value and a specific spreading code sequence.

In the radio transmission system of the present invention, the spreading factor control receiving means is preferably configured to comprise spreading factor determining means for determining the spreading factor on the basis of control information included in a control signal sent from the transmitter as a communicating correspondent.

In the radio transmission system of this configuration, the receiver is able to control the spreading factor on the basis of the control information notified by the transmitter as a communicating correspondent.

In the radio transmission system of the present invention, the spreading factor determining means is preferably configured to determine the spreading factor according to either information indicating a cell configuration or information designating a spreading factor, included in the control signal from the transmitter.

In the radio transmission system of this configuration, the receiver changes the spreading factor on the basis of the system information notified by the transmitter, e.g., on the basis of the information indicating the cell environment or the information designating the spreading factor.

(1) A case where the information notified by the transmitter is information indicating a cell environment In this case, since the transmitter (e.g., a base station) manages the system information, it notifies mobile stations of cell environment information as the control information according to a cellular system of multiple cells, or an isolated cell (e.g., an indoor office environment), so that the mobile stations set the spreading factors suitable for their respective cell environments.

(2) A case where the information notified by the transmitter is information designating a spreading factor In this case, the transmitter notifies mobile stations of the information designating the spreading factor determined according to propagation conditions of uplinks (delay profiles or the like) at the transmitter, as the control information, and the mobile stations set the spreading factors suitable for the propagation environments.

The above schemes (1) and (2) enable a device equipped with one radio interface to be connected in a seamless manner between different cell environments. As a result, it becomes feasible to provide high-speed information transmission service under different cell environments for users and thus greatly enhance user's convenience.

A radio transmission method according to the present invention is a radio transmission method configured to, on the occasion of radio transmission of information between a transmitter and a receiver, perform the radio transmission of information using an orthogonal frequency and code division multiplexing transmission scheme of parallelly transmitting identical information by a plurality of sub-carriers, wherein converting means of the transmitter comprises a step of parallelly converting channel-coded information according to symbols transmitted simultaneously, and wherein spreading means of the transmitter comprises a step of spreading a sequence of parallelized symbols in at least one of a frequency direction and a time direction by a spreading code sequence of a preading factor determined based on a plurality of changeable spreading factors.

In the radio transmission method of the present invention, preferably, spreading means of the transmitter comprises a step of spreading a sequence of parallelized symbols in both a frequency direction and a time direction by a spreading code sequence of a spreading factor determined based on a plurality of changeable spreading factors.

In the radio transmission method of the present invention, preferably, first spreading factor determining means of the transmitter comprises a step of obtaining a propagation environment indicating a condition of a propagation channel between the transmitter and the receiver and determining the spreading factor according to the propagation environment.

In the radio transmission method of the present invention, the first spreading factor determining means is preferably configured to obtain a delay spread indicating a propagation delay property and use the delay spread as the foregoing propagation environment.

In the radio transmission method of the present invention, preferably, second spreading factor determining means of the transmitter comprises a step of determining the spreading factor on the basis of a command from outside.

In the radio transmission method of the present invention, the second spreading factor determining means is preferably configured to determine the spreading factor according to either information indicating a cell configuration or information designating a spreading factor, included in control information representing the command from outside.

In the radio transmission method of the present invention, preferably, spreading factor control receiving means of the receiver comprises a step of separating a received signal at the receiver, into at least one of sub-carriers and time-axial symbols and integrating coherently at least one of sub-carriers and time-axial symbols the number of which is equivalent to the spreading factor determined based on the plurality of changeable spreading factors, using a channel estimation value and a specific spreading code sequence.

In the radio transmission method of the present invention, preferably, spreading factor control receiving means of the receiver comprises a step of separating a receive signal received at the receiver, into both sub-carriers and time-axial symbols and integrating coherently both sub-carriers and time-axial symbols the number of which is equivalent to the spreading factor determined based on the plurality of changeable spreading factors, using a channel estimation value and a specific spreading code sequence.

In the radio transmission method of the present invention, preferably, spreading factor determining means of the spreading factor control receiving means comprises a step of determining the spreading factor on the basis of control information included in a control signal sent from the transmitter as a communicating correspondent.

In the radio transmission method of the present invention, the spreading factor determining means is preferably configured to determine the spreading factor according to either information indicating a cell configuration or information designating a spreading factor, included in the control signal from the transmitter.

A transmitter apparatus according to the present invention is a transmitter apparatus configured to perform radio transmission of information together with a receiver apparatus, using an orthogonal frequency and code division multiplexing transmission scheme of parallelly transmitting identical information by a plurality of sub-carriers, the transmitter apparatus comprising converting means for parallelly converting channel-coded information according to symbols transmitted simultaneously, and spreading means for spreading a sequence of parallelized symbols in at least one of a frequency direction and a time direction by a spreading code sequence of a spreading factor determined based on a plurality of changeable spreading factors.

In the transmitter apparatus of the present invention, the spreading means is preferably configured to spreading a sequence of parallelized symbols in both a frequency direction and a time direction by a spreading code sequence of a spreading factor determined based on a plurality of changeable spreading factors.

The transmitter apparatus of the present invention is preferably configured to comprise first spreading factor determining means for obtaining a propagation environment indicating a condition of a propagation path between the transmitter and the receiver and determining the spreading factor according to the propagation environment.

In the transmitter apparatus of the present invention, the first spreading factor determining means is preferably configured to obtain a delay spread indicating a propagation delay property and use the delay spread as the propagation environment.

The transmitter apparatus of the present invention is preferably configured to comprise second spreading factor determining means for determining the spreading factor on the basis of a command from outside.

In the transmitter apparatus of the present invention, the second spreading factor determining means is preferably configured to determine the spreading factor according to either information indicating a cell configuration or information designating a spreading factor, included in control information representing the command from outside.

A receiver apparatus according to the present invention is a receiver apparatus configured to receive a signal radio-transmitted using an orthogonal frequency and code division multiplexing transmission scheme from a transmitter apparatus, the receiver apparatus comprising spreading factor control receiving means for separating a received signal at the receiver, into at least one of sub-carriers and time-axial symbols and integrating coherently at least one of sub-carriers and time-axial symbols the number of which is equivalent to a spreading factor determined based on the plurality of changeable spreading factors, using a channel estimation value and a specific spreading code sequence.

In the receiver apparatus of the present invention, the spreading factor control receiving means is preferably configured to comprise separating a received signal at the receiver, into both sub-carriers and time-axial symbols and integrating coherently both sub-carriers and time-axial symbols the number of which is equivalent to the first spreading factor determined based on the plurality of changeable spreading factors, using a channel estimation value and a specific spreading code sequence.

In the receiver apparatus of the present invention, the spreading factor control receiving means is preferably configured to comprise spreading factor determining means for determining the spreading factor on the basis of control information included in a control signal sent from the transmitter as a communicating correspondent.

In the receiver apparatus of the present invention, the spreading factor determining means is preferably configured to determine the spreading factor according to either information indicating a cell configuration or information designating a spreading factor, included in the control signal from the transmitter.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention may be more readily described with reference to the accompanying drawings, in which:

FIG. 9 is a diagram showing a configuration example of a transmitter baseband processing section in the case where the variable spreading factor OFCDM of the present invention is applied to a downlink;

FIG. 11 is a diagram showing simulation specifications used for evaluation of capacity of the variable spreading factor OFCDM of the present invention by simulation;

DESCRIPTION OF THE PREFERRED EMBODIMENTS

The embodiments of the present invention will be described below on the basis of the drawings.

Figure 1:
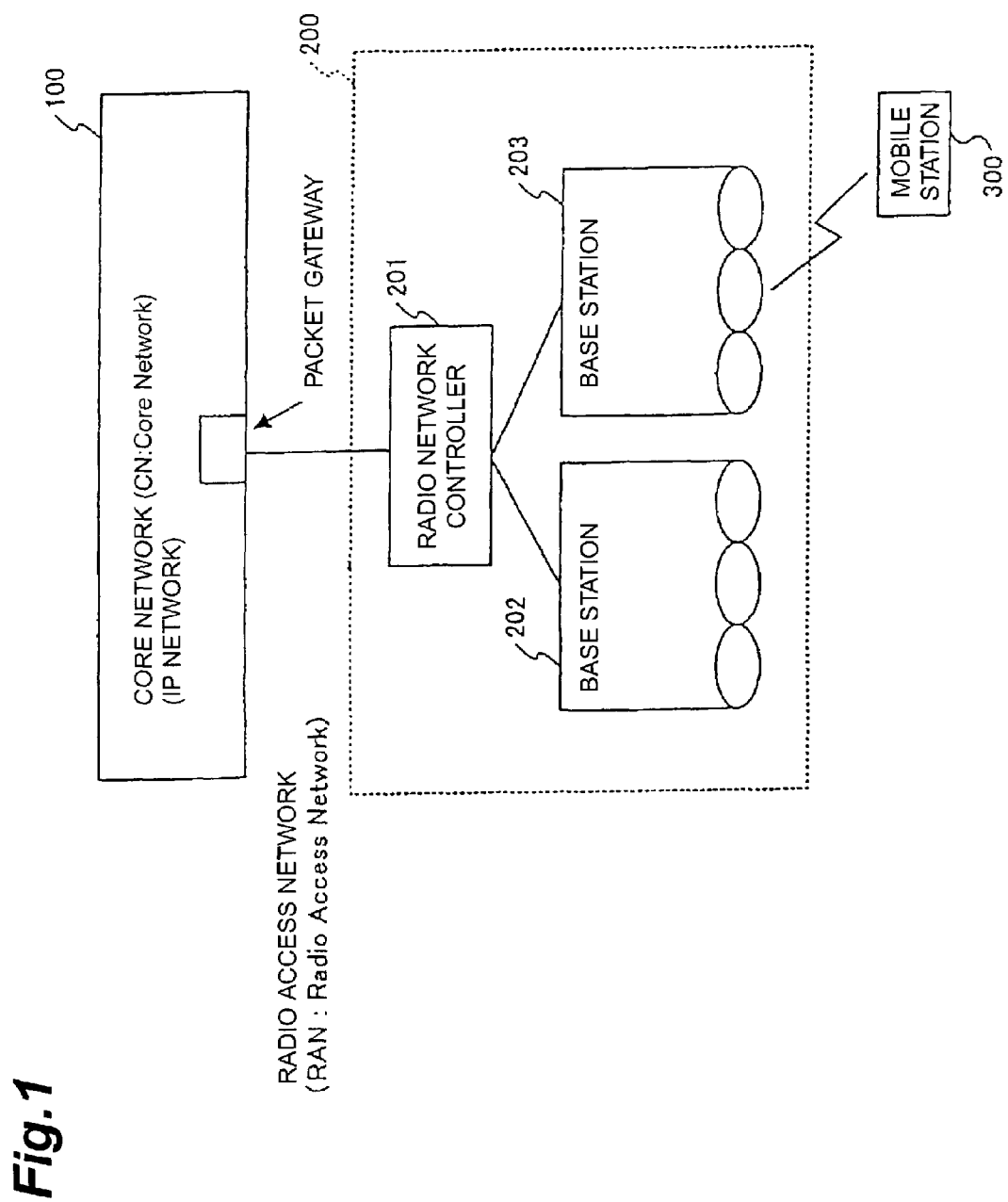
FIG. 1 is a diagram showing a configuration example (No. 1) of a mobile communication system as an embodiment of the present invention.

FIG. 1 is a diagram showing an example of the radio transmission system as an embodiment of the present invention, e.g., an example of a mobile communication system. FIG. 1 shows a configuration example where the system includes a radio network control station, and FIG. 2 a configuration example where mobile stations are directly connected to a core network (IP network), without intervention of the radio network control station.

In FIG. 1, the mobile communication system is composed of a core network (CN) 100 and a radio access network (RAN) station 200. Furthermore, the RAN is comprised of a radio network control station 201 and a plurality of base stations 202, 203. The base stations 202, 203 are configured in a sector system. A packet signal from the core network 100 is transmitted via the radio network control station 201 to a base station 203 establishing a radio link with a mobile station 300.

The radio network controller 201 has handover combining (uplink)/distribution (downlink) functions. Soft handover is carried out for uplinks, and fast (or slow) cell selection for downlinks. Specifically, in the case of the uplinks, a packet channel transmitted from the mobile station 300 is received at a plurality of cells (base stations) of soft handover candidates during handover and the packet signals received at the base stations are transferred through a wire transmission line to the radio network controller 201 to be combined based on reliability information.

On the other hand, in the case of the downlinks, an identical packet signal is transmitted from the radio network controller 201 to cells of handover candidates (base stations), a base station having the smallest path loss difference with respect to the mobile station is selected out of the base stations of soft handover candidates, and a packet channel is sent from this selected base station to the mobile station 300. Concerning the selection of this optimal cell (base station), the fast cell selection and the slow cell selection are defined as a method of instantaneously selecting a base station so as to achieve the smallest path loss difference to the mobile station in a short time period following fading variation and updating the base station selected and as a method of selecting a base station with the smallest path loss difference after shadowing variation and distance variation as an average of fading variation and updating the base station selected, respectively. In either case, the packet channel is transmitted from one optimal cell (base station) with the smallest path loss difference, in order to decrease interference with the other cells. Since the propagation delay (delay profile) differs depending upon each cell or each sector, the spreading factor is set based on a delay spread measured at the base station 202, 203 or at the mobile station 300.

Figure 2:
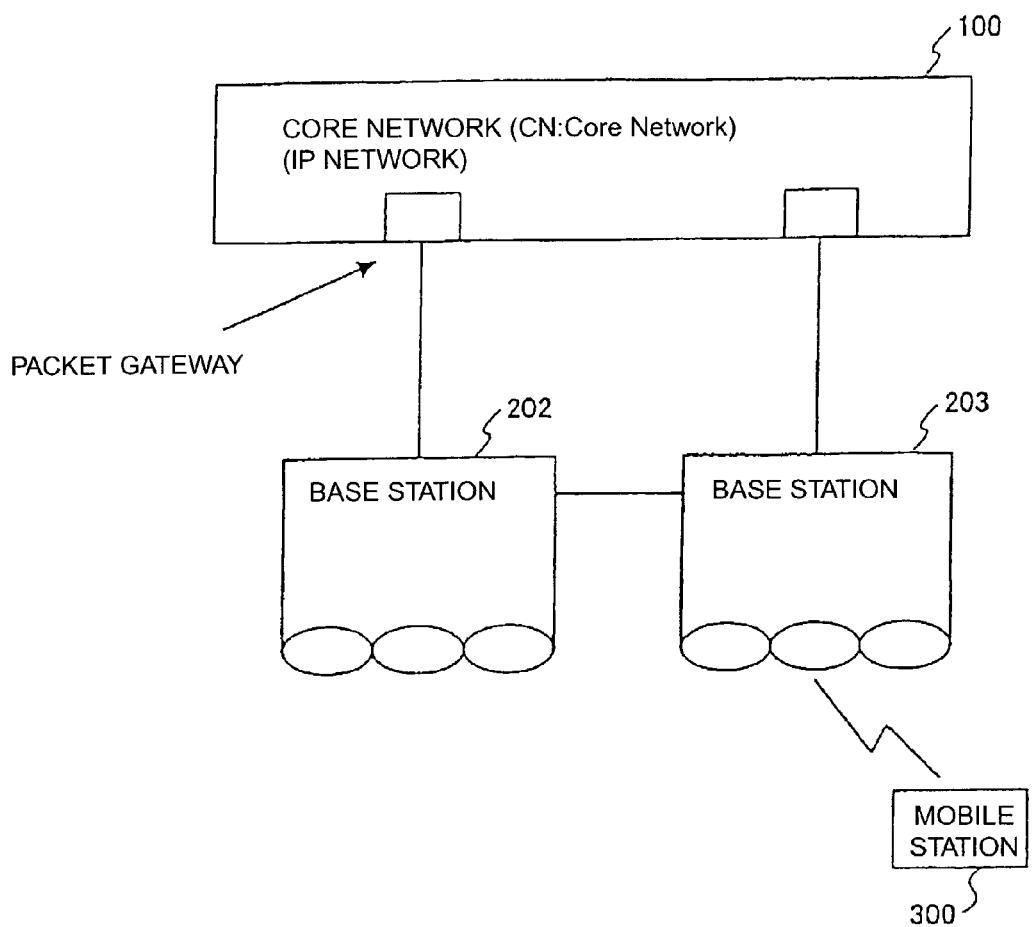
FIG. 2 is a diagram showing a configuration example (No. 2) of a mobile communication system as an embodiment of the present invention.

FIG. 2 shows the configuration in which each base station 202, 203 is coupled, directly to a packet gateway of the core network 100, without intervention of the radio network controller 201 (cf. FIG. 1). In this configuration, when handover is carried out at the mobile station 300, the packet signal transferred from (or those transferred to) the core network 100 is distributed (or are combined) by the original cell (base station) before the handover. The handover operations in the up and down links are carried out according to the procedure similar to FIG. 1.

Figure 3:
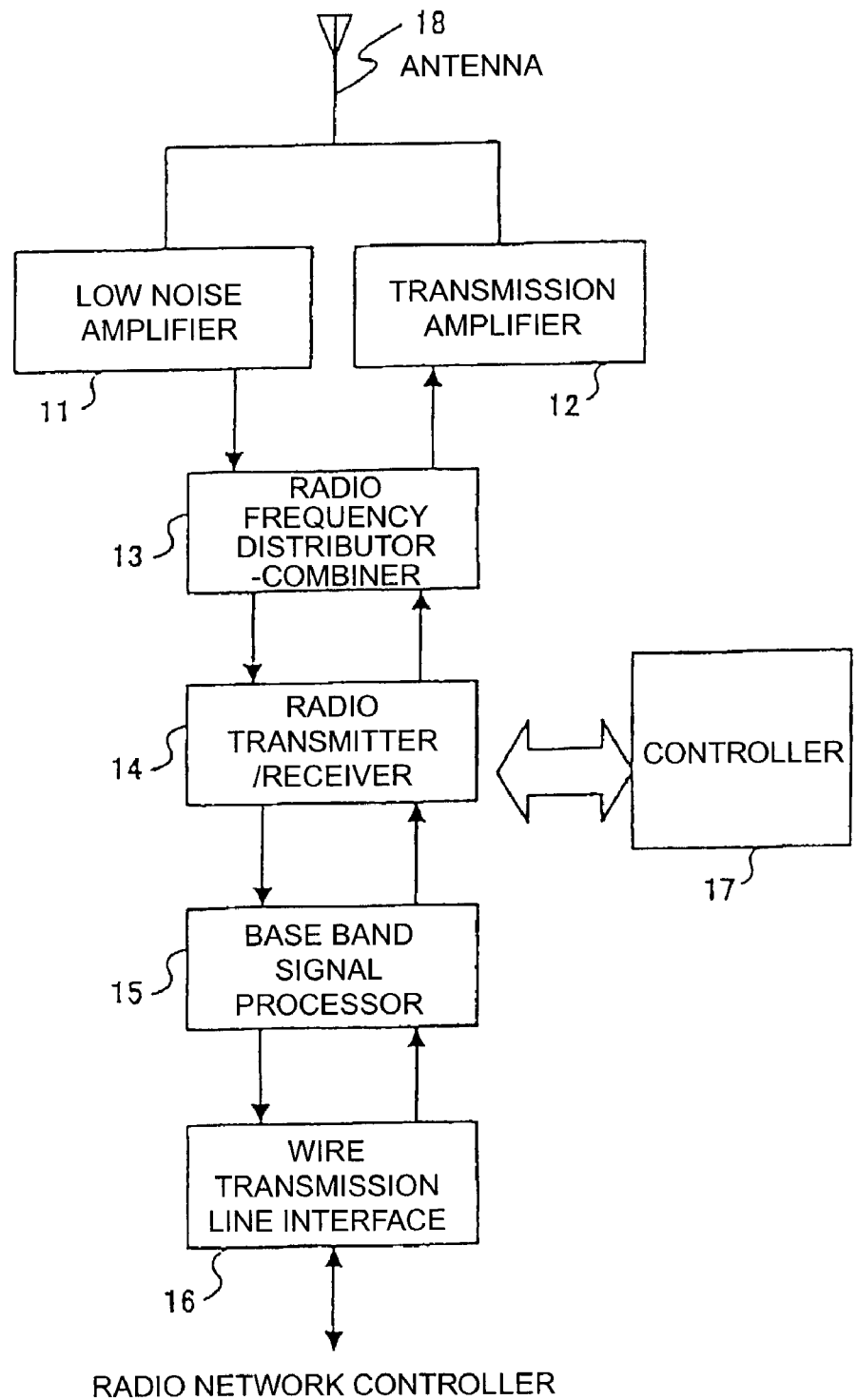
FIG. 3 is a diagram showing a configuration example of a base station according to the present invention.

The base stations 202, 203 shown in FIGS. 1 and 2 (the base stations will be denoted by only reference symbol "202" because the base station 202 and the base station 203 have the same instrumental configuration) are configured, for example, as shown in FIG. 3.

In FIG. 3, the base station 202 is comprised of a low noise amplifier 11, a transmission amplifier 12, a radio frequency distributor-combiner 13, a radio transmitter/receiver 14, a base band signal processor 15, a wire transmission line interface 16, a controller 17, and an antenna 18.

The operation of the base station 202 will be outlined below in the configuration of the base station 202 shown in FIG. 1.

Packet data sent from the radio network controller 201 (the packet gateway controller of the core network) is received via the wire transmission line interface 16 by the base band signal processor 15 and an OFCDM signal is generated according to the spreading factor set by the controller 17. A D/A converter of the radio transmitter/receiver 14 converts this OFCDM signal into In-Phase and Quadrature components, and they are then converted into intermediate-frequency (IF) signals by a quadrature modulator to be upconverted to RF modulated signals. The upconverted RF modulated signals are combined at the radio frequency distributor-combiner 13, the combined signal is amplified by the power amplifier 12, and the amplified signal is transmitted from the antenna 18.

On the other hand, a received signal through the antenna 18 is amplified by the low noise amplifier 11, the amplified signal is subjected to allocation at the radio frequency distributor-combiner 13, then the signal is downconverted into an IF signal at the radio transmitter/receiver 14, and the signal is subjected to quadrature detection to be converted into analog in-phase and quadrature components. Then they are converted into digital signals by an A/D converter in the base band signal processor 15, and the digital signals are thereafter demodulated and error-correction-decoded to recover a transmitted packet data sequence. The packet data recovered in this way is transferred via the wire transmission line interface 16 to the radio network controller 201 (the packet gateway controller of the core network).

Figure 4:
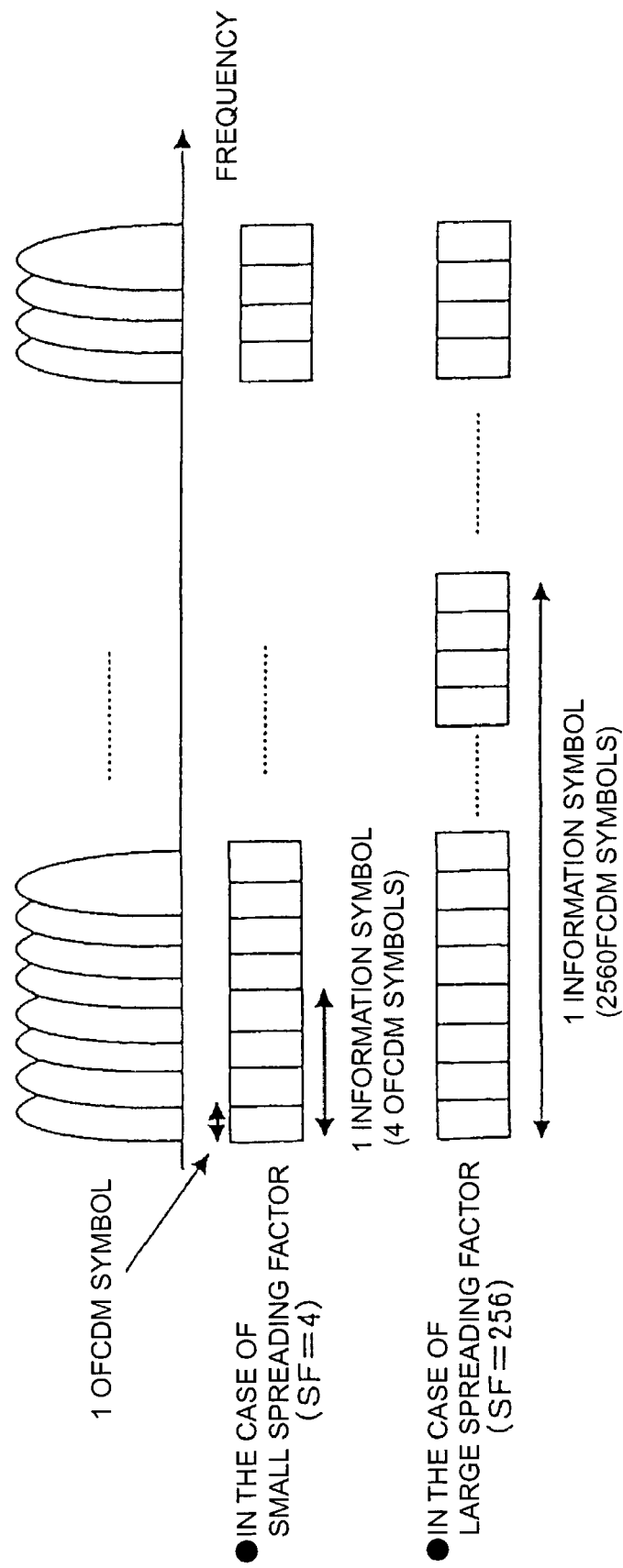
FIG. 4 is a diagram showing spreading and interleaving in the frequency domain.

The controller 17 performs the setting of the spreading factor as described previously, and this spreading factor is set based on the delay spread measured at the radio transmitter/receiver 14. For example, when the delay spread is large, as shown in FIG. 4, amplitude (phase) variation becomes large within small frequency bands, i.e., within intervals of a smaller number of sub-carriers, and interference between codes increases because of destruction of orthogonality in the case of spreading on the frequency axis using orthogonal codes. Therefore, the spreading is carried out in sub-carrier intervals where the amplitude variation can be assumed to be almost constant. Namely, the spreading factor is set to the number of sub-carriers in a frequency range where the amplitude variation can be assumed to be almost constant. In general, where the size of the delay spread is defined as $\tau$, the spreading factor SF meets the following relation.

$$SF \approx 1/\tau$$

By setting the largest spreading factor within the scope satisfying the above relation, it is feasible to minimize the influence of interference with the other cells. When the spreading factor is small, a lot of information symbols are mapped (frequency-interleaved) over the entire system band, i.e., across all the sub-carriers. As the spreading factor becomes larger, the number of information symbols that can be mapped across all the sub-carriers, decreases. In either case, because the information data is mapped across all the sub-carriers by spreading or frequency interleaving, the adequate frequency interleaving effect can be achieved thereby. As described, the base station according to the present invention is able to realize the OFCDM scheme capable of adaptively setting the spreading factor according to the delay spread of the propagation path.

Figure 15:
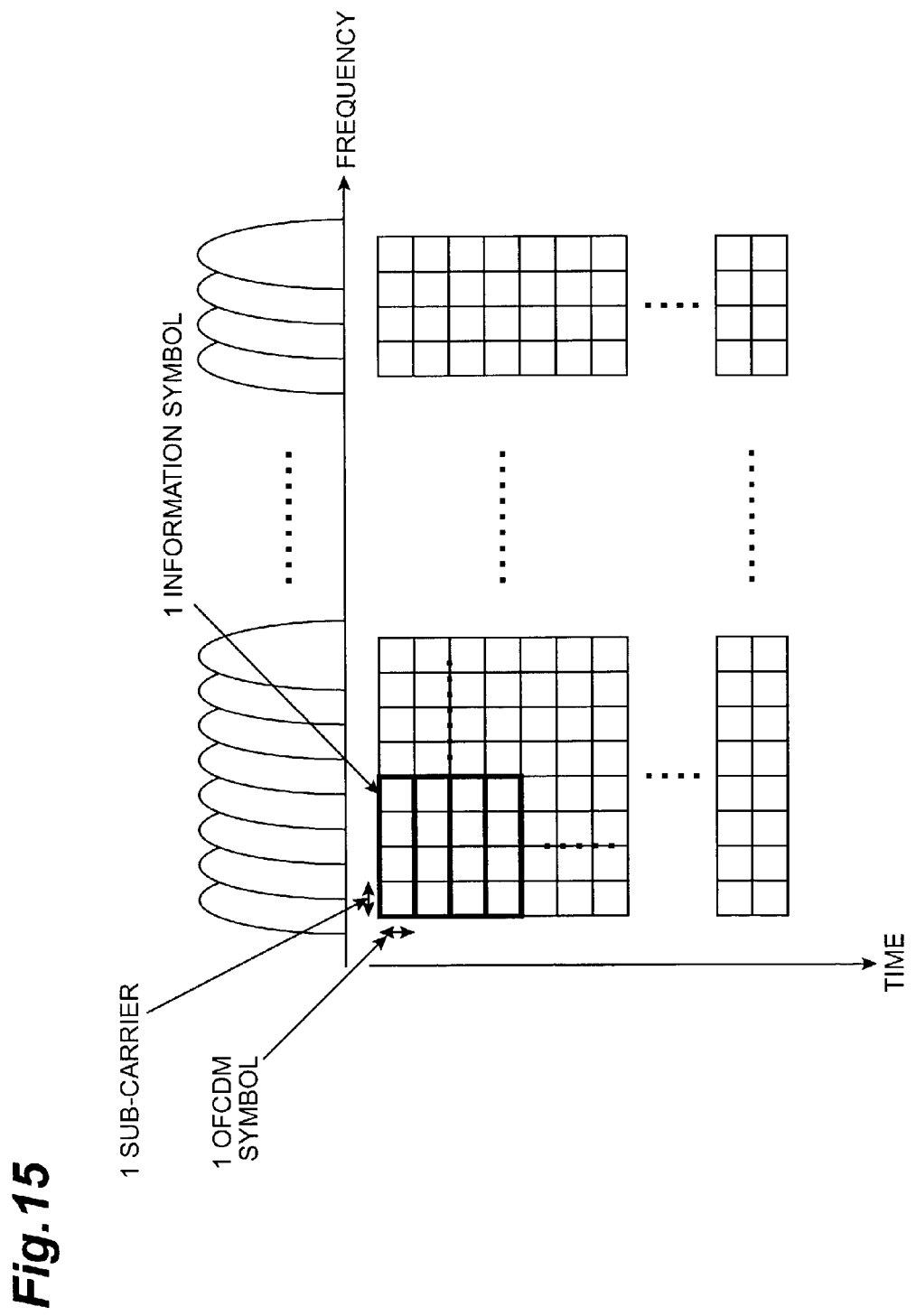
FIG. 15 is a diagram showing spreading and interleaving in the frequency-time domain.
Figure 16:
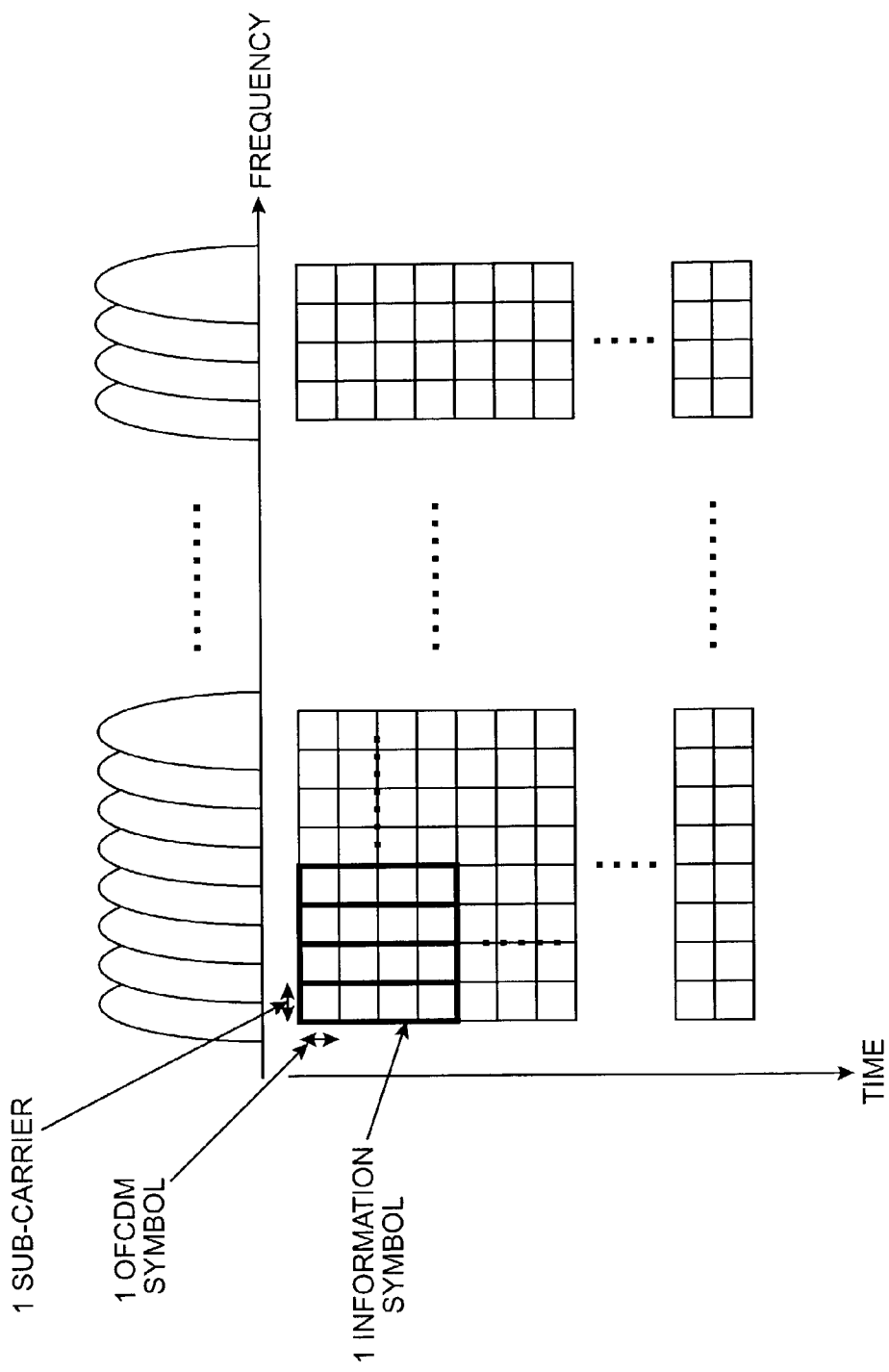
FIG. 16 is a diagram showing spreading and interleaving in the frequency-time domain.
Figure 17:
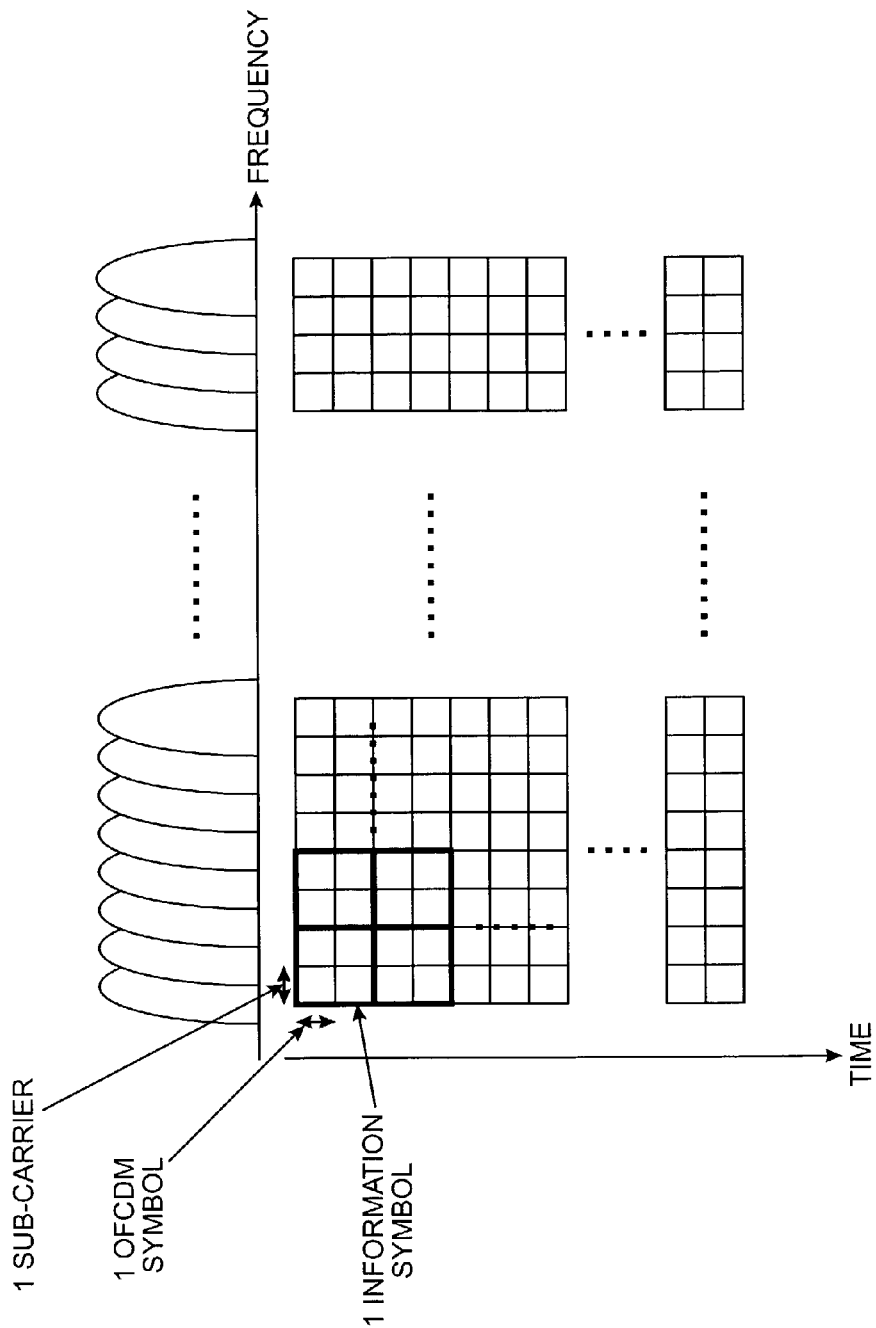
FIG. 17 is a diagram showing spreading and interleaving in the frequency-time domain.

The information data spreading and interleaving in the frequency domain in FIG. 4, can be replaced by spreading and interleaving in the time domain also as shown in FIG. 15 to FIG. 17. In FIG. 15, 1 information symbol is transmitted by 1 OFCDM symbol (time-axial symbol) and 4 sub-carriers. In FIG. 16, 1 information symbol is transmitted by 4 OFCDM symbols and 1 sub-carrier. In FIG. 17, 1 information symbol is transmitted by 2 OFCDM symbols and 2 sub-carriers. In FIG. 15 to FIG. 17, the spreading factor is 4.

It is also possible to acquire the information on the spreading factor set at the controller 17, from the radio network controller 201 or the core network 100 which is a superordinate station over the base station 202.

Figure 5:
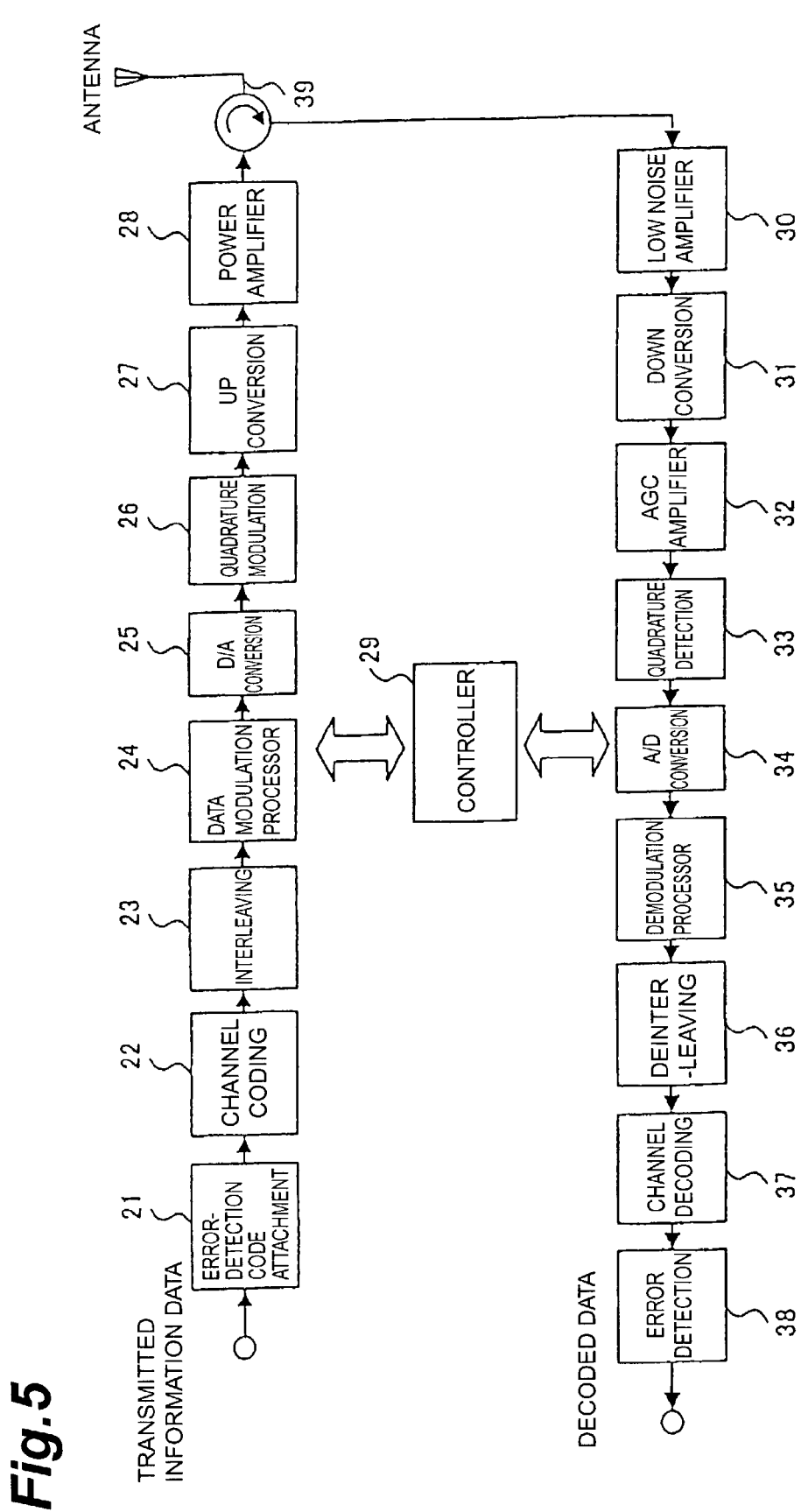
FIG. 5 is a diagram showing a configuration example of a mobile station according to the present invention.

FIG. 5 is a diagram showing a configuration example of the mobile station 300.

In FIG. 5, the mobile station 300 is comprised of an error detection (packet error detection) code attachment section 21, a channel encoder 22, an interleaving section 23, a data modulation processor 24, a D/A converter 25, a quadrature modulator 26, an up converter 27, a power amplifier 28, a controller 29, a low noise amplifier 30, a down converter 31, an AGC amplifier 32, a quadrature detector 33, an A/D converter 34, a demodulation processor 35, a deinterleaving section 36, a channel decoder 37, an error detection (packet error detection) section 38, and an antenna 39.

The operation at the mobile station 300 will be outlined below with reference to the same drawing.

The error detection code attachment section 21 attaches error detection codes (CRC codes) to transmitted packet data (transmitted information data), the channel encoder 22 thereafter performs channel encoding of the data, and then the interleaving section 23 performs the interleaving operation thereof. After that, the encoded data sequence is multiplexed with pilot bits for channel estimation and lower-layer control bits to be data-modulated at the data modulation processor 24. The in-phase and quadrature data sequences thus data-modulated are converted into analog signals at the D/A converter 25 and the analog signal are then quadrature-modulated at the quadrature modulator 26. Then the quadrature-modulated signal is converted into an RF signal at the up converter 27, the RF signal is amplified by the power amplifier 28, and the amplified signal is transmitted from the antenna 39.

The signal transmitted as described above is transmitted in the form of an OFCDM signal according to the spreading factor set by the controller 29.

On the other hand, an OFCDM signal received through the antenna 39 is amplified by the low noise amplifier 30, the amplified signal is then downconverted to an IF signal by the down converter 31, and the IF signal is linearly amplified by the AGC amplifier 32. Thereafter, the amplified signal is subjected to quadrature detection at the quadrature detection section 33. The quadrature-detected in-phase and quadrature signals are converted into digital data by the A/D converter 34 and thereafter the digital data is demodulated. The demodulated data is deinterleaved by the deinterleaving section 36 and then the channel decoding section 37 error-correction-decodes the data to recover the transmitted packet data.

Figure 6:
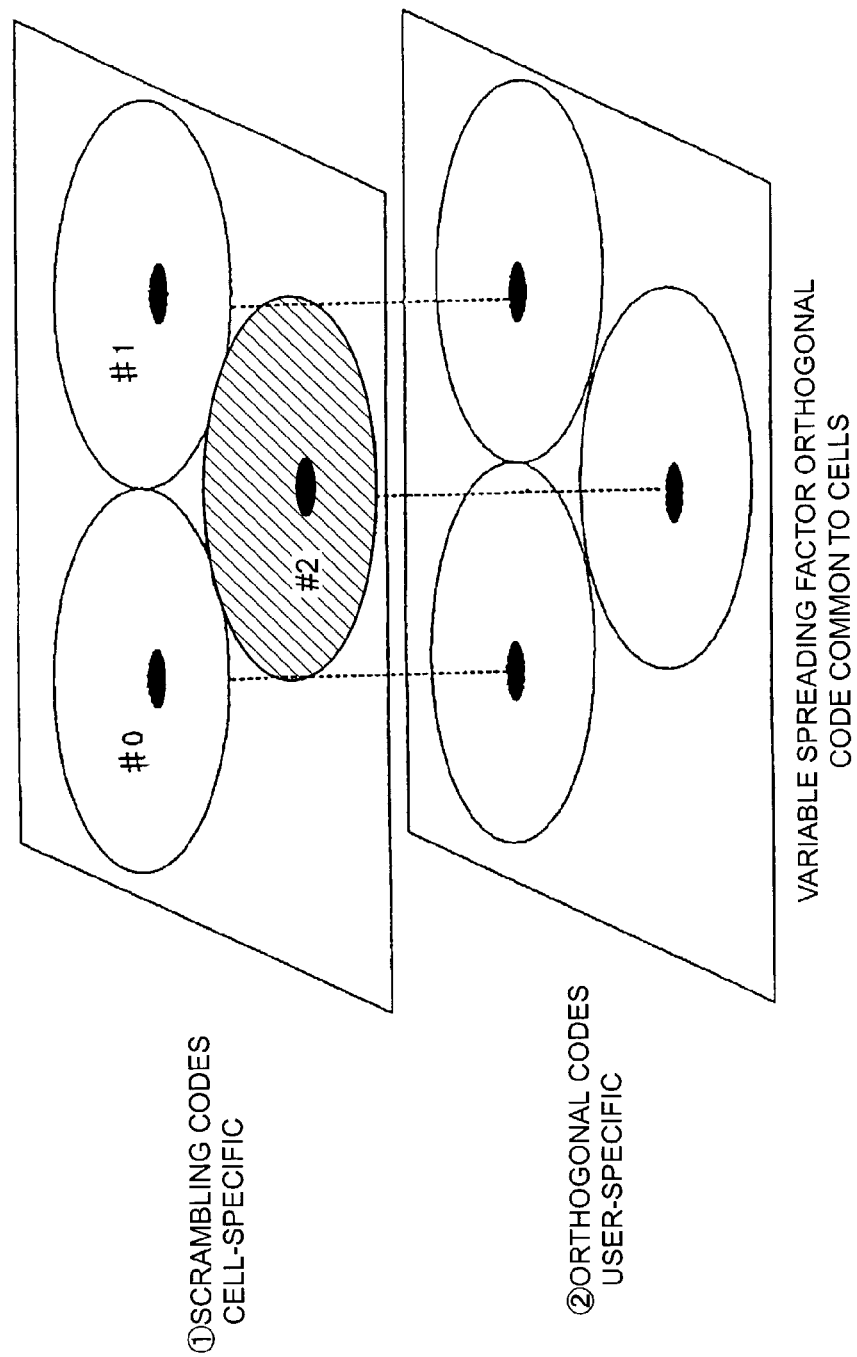
FIG. 6 is a schematic illustration showing a spreading code allocation method.

FIG. 6 is a conceptual diagram showing allocation of spreading codes in the variable spreading factor OFCDM according to the present invention. As shown in the same figure, double spreading is carried out using scrambling codes (1) specific to respective cells and orthogonal codes (2) used on a common basis to the cells and used for identifying code channels in the cells. The scrambling codes specific to the cells are codes obtained by cutting a code of a very long period into lengths corresponding to the number of all sub-carriers. The orthogonal codes can be Walsh codes or other codes. The length of the orthogonal codes, i.e., the spreading factor, is controlled according to a cell environment and a propagation environment (delay spread).

Figure 7:
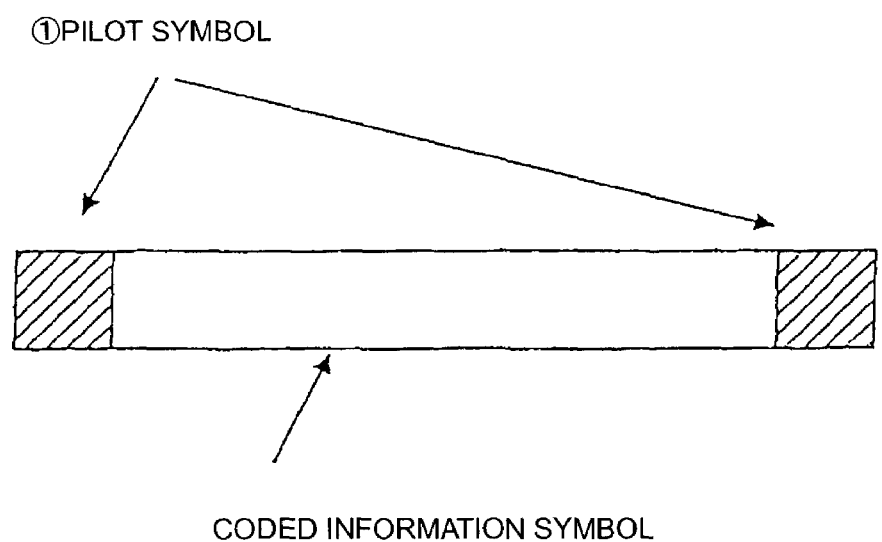
FIG. 7 is a diagram showing a configuration example of pilot symbols for channel estimation.

FIG. 7 is a diagram showing a configuration example of pilot symbols for channel estimation.

As shown in the same figure, pilot symbols (1) are time-multiplexed at the front and rear ends of a packet in a coded symbol sequence. By adding coherently FFT output signals of all the pilot symbols at the front and rear ends of a packet of each sub-carrier, a channel impulse response (channel estimation value) of this packet can be determined. Particularly, when the delay spread is small, a fading correlation between adjacent sub-carriers is very large. In that case, the channel estimation value can be determined with higher accuracy by obtaining channel estimation values of respective sub-carriers estimated across several adjacent sub-carriers and further averaging them coherently.

The following will present the result of theoretical analysis on the downlink capacity of the variable spreading factor OFCDM according to the present invention.

(Eq. 2) below is an approximate expression representing the relationship between the numbers of users per cell satisfying the required reception quality in use of OFCDM and OFDM, $N_{OFCDM}$ and $N_{OFDM}$.

$$\frac{N_{OFCDM}}{N_{OFDM}} = \frac{1}{SF} \cdot C_{MUX} \cdot \frac{1+\eta_{OFDM}}{1+\eta_{OFCDM}} \cdot \frac{F_{OFDM}}{F_{OFCDM}} \cdot \frac{S_{OFCDM}}{S_{OFDM}}$$

$N_{OFCDM}$:

number of users per cell satisfying the required reception quality of OFCDM $N_{OFDM}$: number of users per cell satisfying the required reception quality of OFDM SF: spreading factor $C_{MUX}$: number of multiplexed codes of OFCDM satisfying the required quality $f_{OFCDM}$: power ratio of multiple access interference to multipath interference of OFCDM $f_{OFDM}$: power ratio of multiple access interference to multipath interference of OFDM $F_{OFCDM}$: number of cell frequency reuse of OFCDM $F_{OFDM}$: number of cell frequency reuse of OFDM $S_{OFCDM}$: sectoring effect of OFCDM $S_{OFDM}$: sectoring effect of OFDM According to (Eq. 2), since the OFCDM is configured to make copies of an identical coded symbol sequence by the number equivalent to SF, allocate them to SF sub-carriers, and transmit them, the frequency utilization efficiency thereof in one-code transmission is 1/SF of that in the OFDM, but the OFCDM allows multiplexing of $C_{MUX}$ code channels spread by different orthogonal codes on the frequency axis. In the multipath fading (frequency selective fading) channels, however, the orthogonality among code channels on the frequency axis is broken mainly by variation of the amplitude components among sub-carriers. Accordingly, because of the code-to-code interference, the number of multiplexed code channels capable of satisfying the required reception quality becomes smaller than SF.

Therefore, the following relation holds.

$$(1/SF) \cdot C_{MUX} \approx 0.5 \leq 1.0$$

Figure 8B:
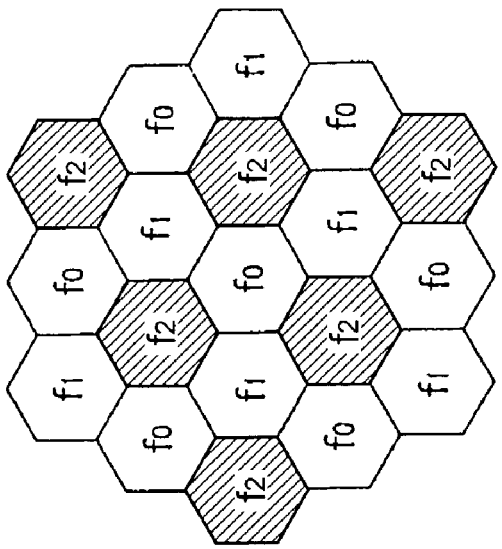
FIG. 8B is a diagram showing a single-cell environment.

In an isolated cell environment (cf. FIG. 8B) like wireless LAN (e.g., IEEE802.11), the number of users capable of satisfying the required reception quality of OFCDM, i.e., the capacity, thus becomes smaller than that of OFDM.

Figure 8A:
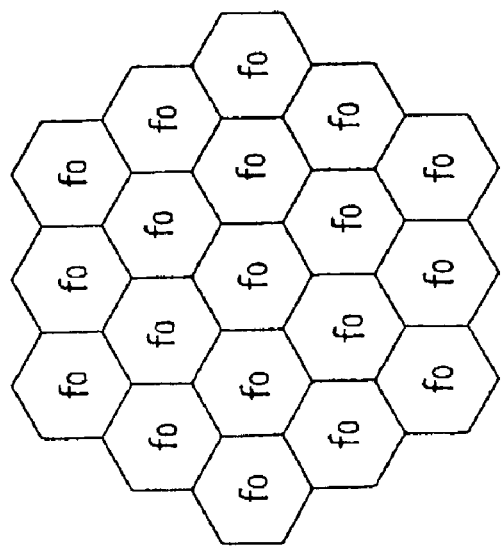
FIG. 8A is a diagram showing a multi-cell environment.

In a multi-cell environment (cf. FIG. 8A) on the other hand, because the OFCDM involves the spreading with scrambling codes specific to the respective cells in the frequency domain, the same frequency band can be used in neighboring (adjacent) cells. Accordingly, it is feasible to realize the cell frequency reuse of 1. In contrast to it, in the case of the OFDM, the same frequency band cannot be used in neighboring (adjacent) cells because of the co-channel interference, and the cell frequency reuse of 3 is required in the case using 2-branch antenna diversity reception. Accordingly, the following relations hold.

$$\frac{1}{SF} \cdot C_{MUX} \approx 0.5 \leq 1.0, \frac{F_{OFDM}}{F_{OFCDM}} = 3$$

As a result, the capacity in the multi-cell environment of OFCDM becomes greater than that of OFDM, without consideration to the sectoring effect. When the sectoring is further taken into consideration, the OFCDM permitting the cell frequency reuse of 1 demonstrates the greater capacity increasing effect by the sectoring than OFDM, so that the capacity increasing effect of the OFCDM becomes much greater than that of the OFDM.

As described above, it is seen that the OFCDM and the OFDM are suitable for their respective cell environments different from each other. Accordingly, by determining an access method (either the OFCDM scheme or the OFDM scheme) to be activated according to a cell environment, it becomes feasible to realize the fastest information transmission rate in each cell environment and achieve increase of capacity.

Specifically, SF greater than 1 is used in the multi-cell environment like the cellular system or the like, so as to realize the cell frequency reuse of 1. On the other hand, SF=1 is set in the single-cell environment like wireless LAN or the like, so as to change the variable spreading factor OFCDM to the OFDM, thereby increasing the frequency utilization efficiency.

The conventional systems required devices with respective radio interfaces for different cell environments, whereas the variable spreading factor OFCDM is adaptable to the different cell environments by simply varying SF, thus reducing the cost for installation of apparatus.

FIG. 9 is a diagram showing a configuration example of the transmit baseband processor in the case where the variable spreading factor OFCDM of the present invention is applied to the downlink. The transmit baseband processor is placed in the baseband signal processor of the base station 202 shown in FIG. 3.

In FIG. 9, the transmit baseband processor is comprised of a channel encoder 40, an interleaver 41, a multiplexer A 42, a data modulator 43, a multiplexer B 44, a serial/parallel converter (S/P) 45, a copier 46, multipliers 47$_1$-47$_n$, an IFFT (inverse fast Fourier transform) section 48, a guard interval inserter 49, and a spreading code generator 50.

Figure 18:
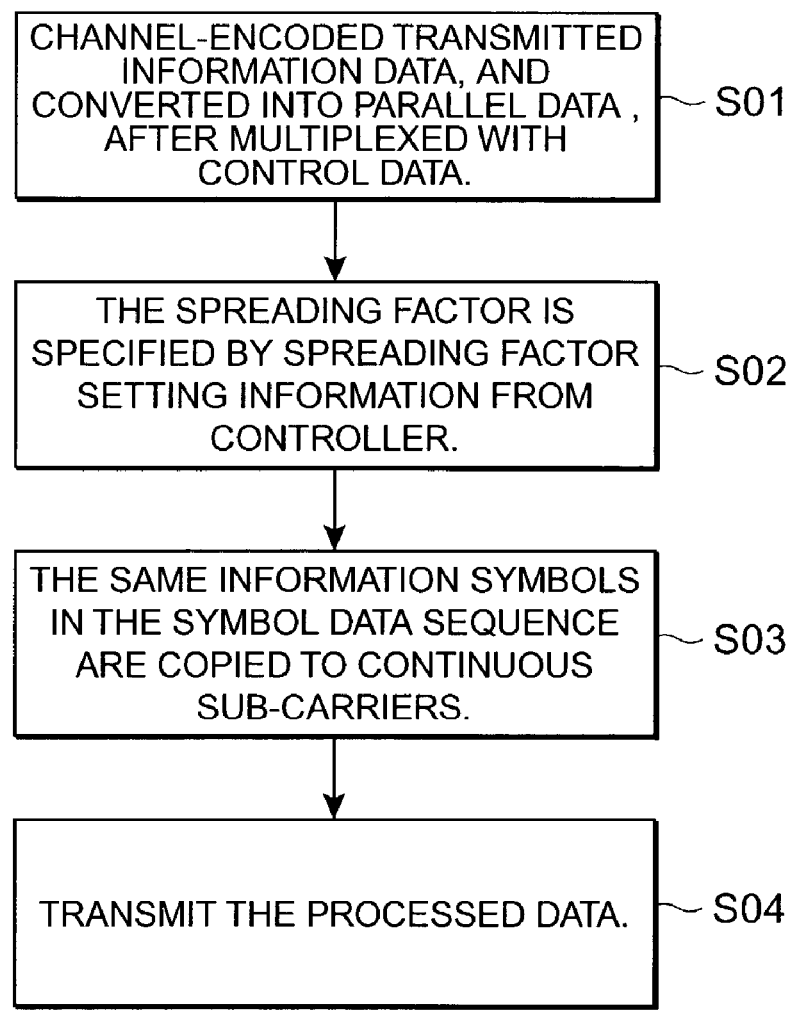
FIG. 18 is a flowchart showing a process at the transmitter base band processing section.

The operation in the transmit base band processor will be described below. (cf. FIG. 9, FIG. 18)

Packet detection codes are first attached to packet data (transmitted information data) and the data is channel-encoded (error-correction-coded) at the channel encoder 40. The information data channel-coded at the channel encoder 40 is subjected to the interleaving operation in the time domain at the interleaver 41 and then the data is multiplexed with control data at the multiplexer A 42. The coded data sequence multiplexed at the multiplexer A 42 is mapped at the data modulator 43 and the data is further multiplexed with pilot bits for channel estimation and control information symbols of the lower layer at the multiplexer B 44. This multiplexed symbol data sequence is subjected to serial/parallel (S/P) conversion at the serial/parallel (S/P) converter 45 to be converted into parallel data in the number equal to (the number of all sub-carriers/the spreading factor) (step S01).

The spreading factor is specified by spreading factor setting information from controller (step S02). The spreading factor is specified by the propagation environment, which indicates the condition of the propagation path between the transmitter and the receiver.

The same information symbols in the symbol data sequence after the S/P conversion as described above are copied to continuous sub-carriers in the number equal to the spreading factor (SF) at the copier 46 (step S03). At this time, the copying operation of the same symbols to the SF sub-carriers can be implemented by repeatedly reading out the symbol sequence stored in a memory. At the copier 46, the same information symbols are also preferably copied to continuous OFCDM symbols. At the copier 46, the same information symbols are also preferably copied in both a frequency direction and a time direction. The spreading factor is designated by spreading factor setting information fed from the controller. After that, the SF, continuous, identical symbol sequences are spread (or scrambled) by spreading codes of the spreading factor SF allocated peculiarly. Then the spread symbol sequences in the number equivalent to the number of all sub-carriers are subjected to the inverse FFT (IFFT) operation at the IFFT section 48 to effect time/frequency conversion into multi-carrier components orthogonal on the frequency axis. Finally, a guard interval is inserted into a symbol of each sub-carrier of the multiple carriers at the guard interval inserter 49. This guard interval insertion is implemented by copying a signal waveform equivalent to last N$_{GI}$ FFT samples of each symbol, to the head of each symbol. The transmit baseband processor transmit the processed data (step S04).

Figure 10:
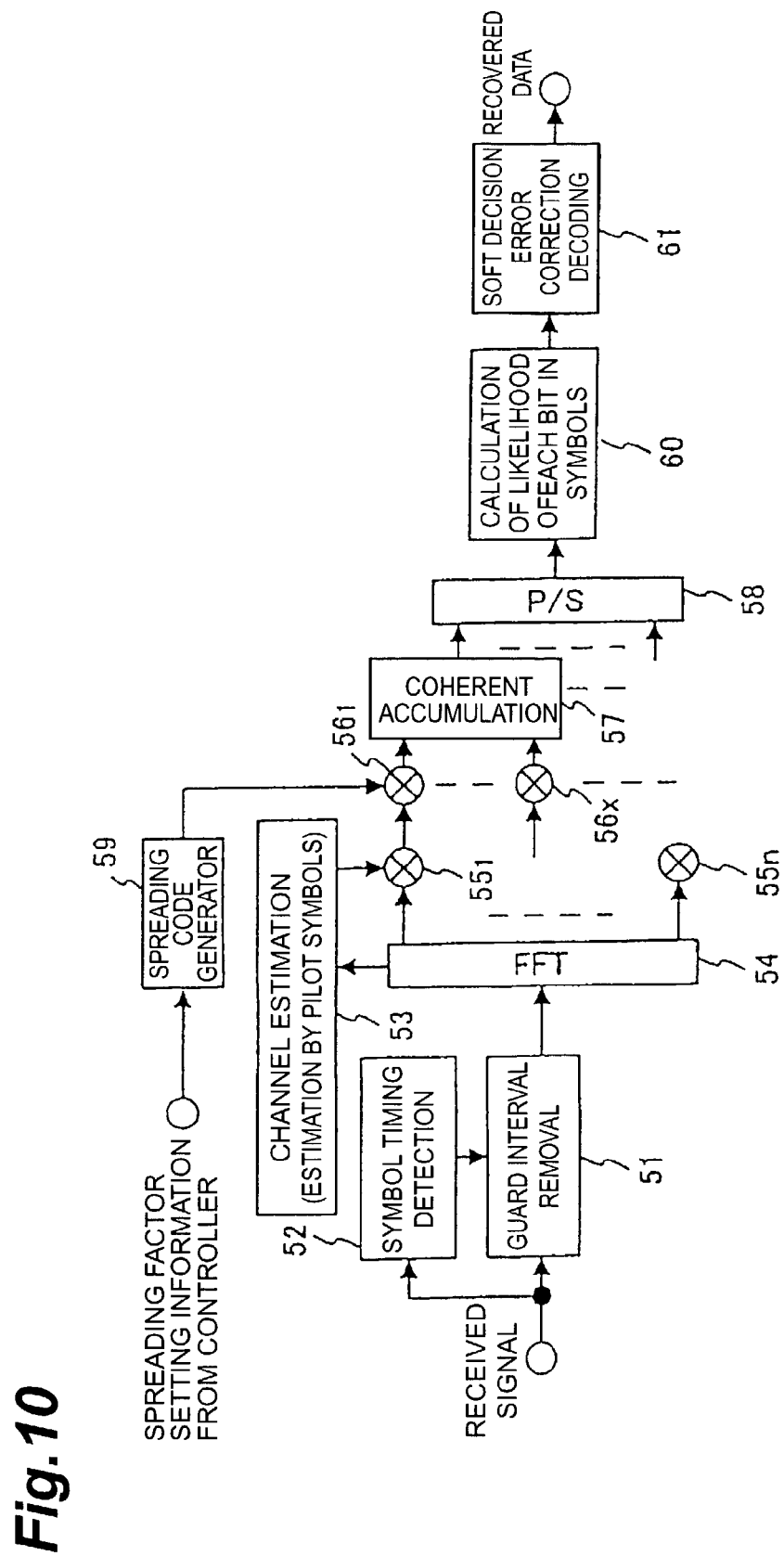
FIG. 10 is a diagram showing a configuration example of a receiver baseband processing section in the case where the variable spreading factor OFCDM of the present invention is applied to a downlink.

FIG. 10 is a diagram showing a configuration example of the receive baseband processor in the case where the variable spreading factor OFCDM of the present invention is applied to the downlink. The receive base band processor is also installed in the base band signal processor of the base station 202 shown in FIG. 3.

As shown in the same figure, the receive baseband processor is comprised of a guard interval remover 51, a symbol timing detector 52, a channel estimator 53, an FFT (fast Fourier transform) section 54, multipliers A 55$_1$-55$_n$, multipliers B 56$_1$-56$_x$, an in-phase adder 57, a parallel/serial (P/S) converter 58, a spreading code generator 59, a likelihood calculator 60, and an error correction decoder 61.

Figure 19:
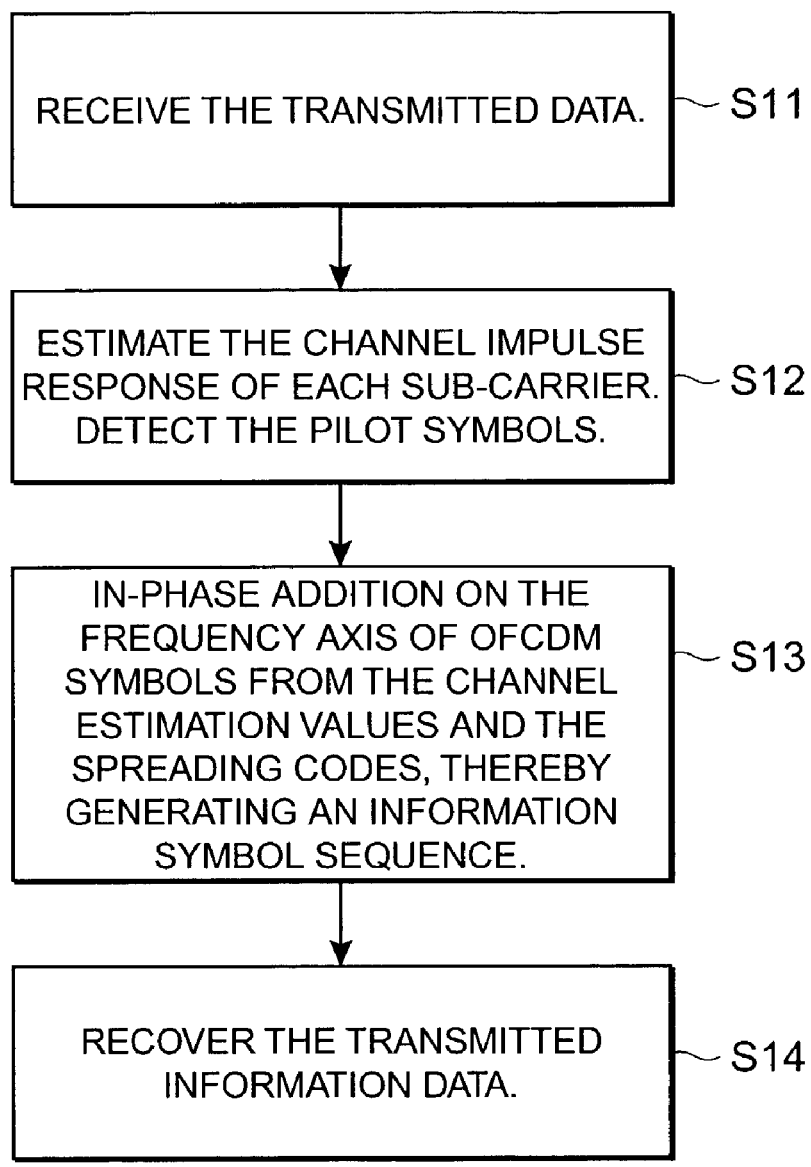
FIG. 19 is a flowchart showing a process at the receiver base band processing section.

The operation in the receive baseband processor will be described below. (cf. FIG. 10, FIG. 19)

The receive baseband processor receive the transmitted data (step S11).

The symbol timing detector 52 first detects the symbol timing (which is the timing for execution of FFT operation and which is also called FFT window timing) from the multi-carrier signal received. The detection of symbol timing can be implemented by correlation detection of guard interval spaces. The guard interval remover 51 removes signals of guard intervals from the symbol timing detected at the symbol timing detector 52 as described above. Thereafter, the FFT section 54 performs the FFT operation based on the estimated FFT window timing to convert the multicarrier signal into parallel symbol sequences. Since the received signal underwent the multi-path fading (frequency selective fading) through terrestrial mobile telecommunication propagation in the cellular system, the channel estimator 53 estimates the channel impulse response of each sub-carrier (channel variation), using the pilot symbols (step S12). The coherent adder 57 performs coherent addition (i.e., despreading) on the frequency axis of OFCDM symbols of SF sub-carrier components from the channel estimation values of the respective sub-carriers and the spreading codes used in spreading, thereby generating an information symbol sequence (step S13). At the coherent adder 57, performs also preferably coherent addition on the time axis. At the coherent adder 57, performs also preferably coherent addition both on the frequency axis and on the time axis. The despread information data symbols in the number equal to (the number of all sub-carriers/the spreading factor) are subjected to P/S conversion at the parallel/serial converter, then are deinterleaved, and thereafter error-correction-decoded at the error correction decoder 61. Then the information symbol sequence after the error correction decoding is subjected to soft decision to recover the transmitted information data (step S14).

The following will describe the handover operation in the case where the variable spreading factor OFCDM of the present invention is applied to the downlink in the multi-cell environment in the configuration of FIG. 1.

Supposing a radio link of a communication channel has already been established between a mobile station staying in an area of an original base station before handover, and the base station, the mobile station is notified of a cell-specific scramble code of a handover destination cell by a control channel attached to the communication channel. If at all the cells a predetermined value (fixed value) is set as a spreading factor of a common control channel for each mobile station of a downlink to first establish a radio link, the mobile station will be able to receive the common control channel of the downlink of the handover destination cell. Therefore, if the common control channel of the handover destination cell includes information for designating the spreading factor of the communication channel, it is feasible to give a command to designate the spreading factor of the communication channel, to the mobile station. The spreading factor is determined at the base station of the handover destination cell. Specifically, the base station of the destination cell determines the optimal spreading factor on the basis of the delay profile generated from the received signal of the communication channel of the uplink from the mobile station.

Since the base station of the handover destination cell provides the command to designate the spreading factor, to the mobile station as described above, the mobile station is able to receive and decode the communication channel of the downlink of the handover destination cell, using the spreading factor thus designated.

FIG. 11 shows the simulation specifications used for evaluation of capacity of the variable spreading factor OFCDM of the present invention by simulation. The evaluation of capacity was carried out based on the average Block Error Rate (BLER) of OFCDM.

As indicated in the same figure, the radio bandwidth (Bandwidth) is 80 MHz and one packet (Packet length) consists of OFCDM pilot symbols of $N_p=4$ and OFCDM coded information symbols of $N_d=60$. The number of sub-carriers $N_c$ is 512, SF 1 (OFDM) and 32 (OFCDM), one packet in OFDM includes $60(N_d) \times 512(N_c)=30{,}720$ information symbols, and one code of one packet in OFCDM includes information symbols numbering $60(N_d) \times 512(N_c)/32(SF)=960$. Therefore, under the condition of one block of 960 information symbols, the capacity evaluation was conducted by comparison between capacities of OFCDM and OFDM based on average BLER. The modulation methods for Data Modulation/Spreading both were QPSK; the channel coding/decoding methods (Channel coding/decoding) were Convolutional coding with the coding rate (R) of ½ and the constraint length (K) of 9; the channel decoding was done by Soft decision Viterbi decoding. The Maximum Doppler frequency was 80 Hz.

Figure 12A:
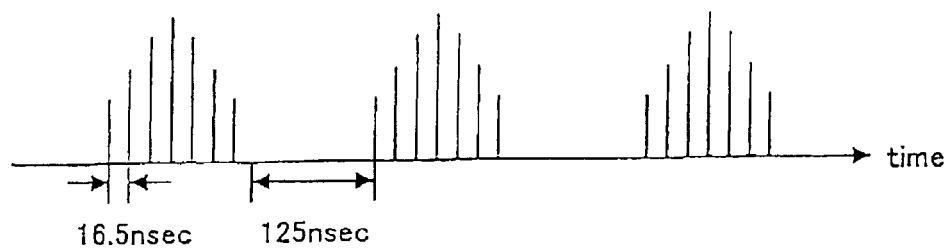
FIG. 12A is a diagram showing an example of the channel model shown in FIG. 11.
Figure 12B:
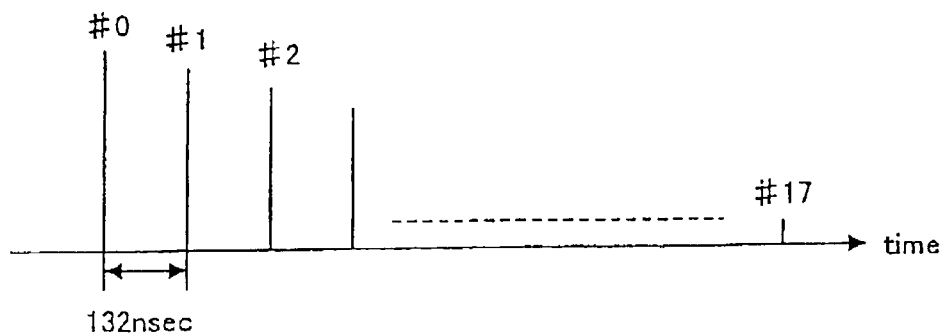
FIG. 12B is a diagram showing an example of the channel model shown in FIG. 11.

Concerning the multiple access interference in the multi-cell environment, consideration was given to interference from six cells surrounding the target cell in the case of OFCDM and to interference from six proximal cells using the same frequency in the cell frequency reuse of 3 in the case of OFDM. A signal from each cell was assumed to be affected by the fourth power rule for distance attenuation, shadowing in the logarithmic normal distribution with the standard deviation of 8 dB, and multipath fading. FIGS. 12A and 12B show Channel models of the multipath fading. The channel models employed were a 24-path model (the delay spread a $\sigma=0.21$ μs) consisting of three path groups, each group being comprised of eight paths in a triangular distribution of average received powers (cf. FIG. 12A), and an 18-path model ($\sigma=0.29$ μs) in an exponential distribution (cf. FIG. 12B).

Figure 13:
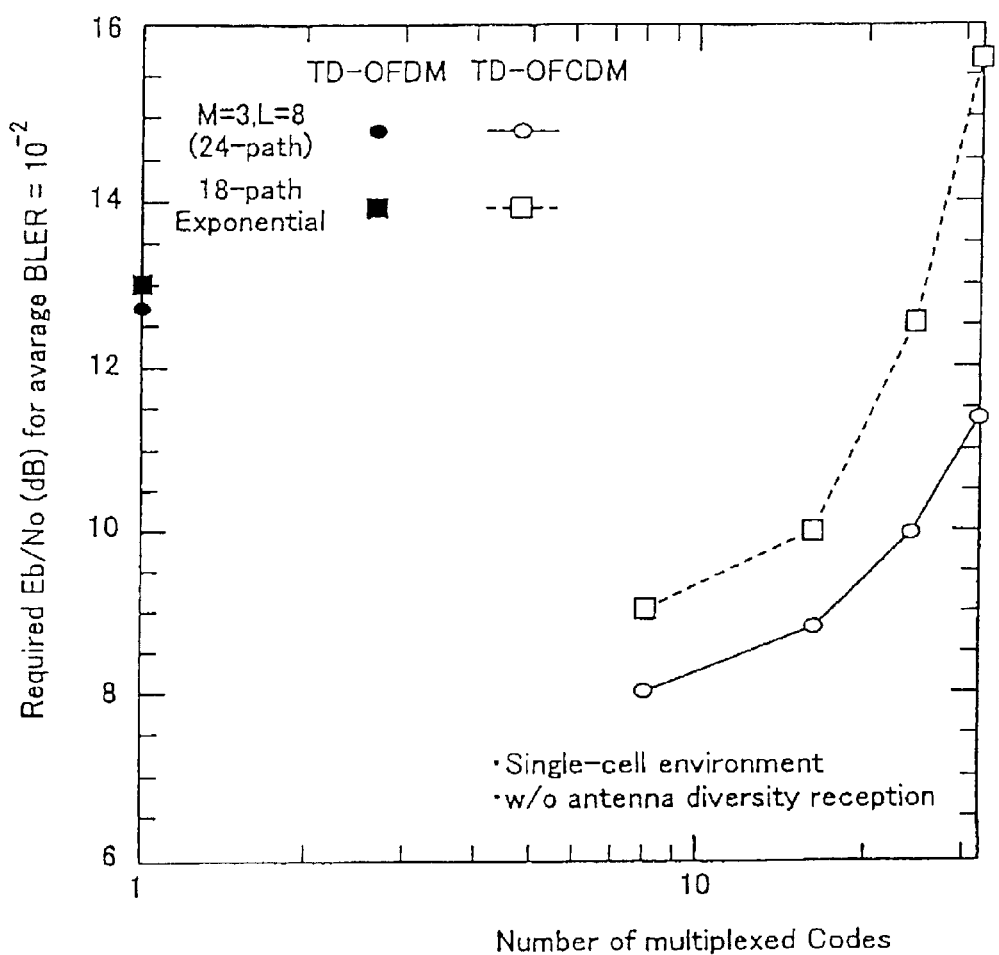
FIG. 13 is a graph showing capacity evaluation characteristics in the single-cell environment in the variable spreading factor OFCDM of the present invention.

Since Document 2 presents the capacity evaluation in the single-cell environment, the capacity characteristics in the single-cell environment in the variable spreading factor OFCDM will be first described with reference to FIG. 13.

When in the single-cell environment comparison is made as to the required average received $E_b/N_o$ characteristics for average BLER=$10^{-2}$ (without antenna diversity reception) against change in the number of multiplexed codes, the number of multiplexed codes in the OFCDM (SF=32) satisfying the same required average received $E_b/N_o$ as that in the OFDM (SF=1) is potentially up to 32 in the case of the 24-path model, while it is about 20 in the case of the 18-path model of the exponential distribution, so as to result in the frequency utilization efficiency lower than in the case of SF=1. This is conceivably because the decrease in the number of paths decreases the diversity gain and the increase of the delay spread magnifies the influence of breakdown of orthogonality on the frequency axis.

Figure 14:
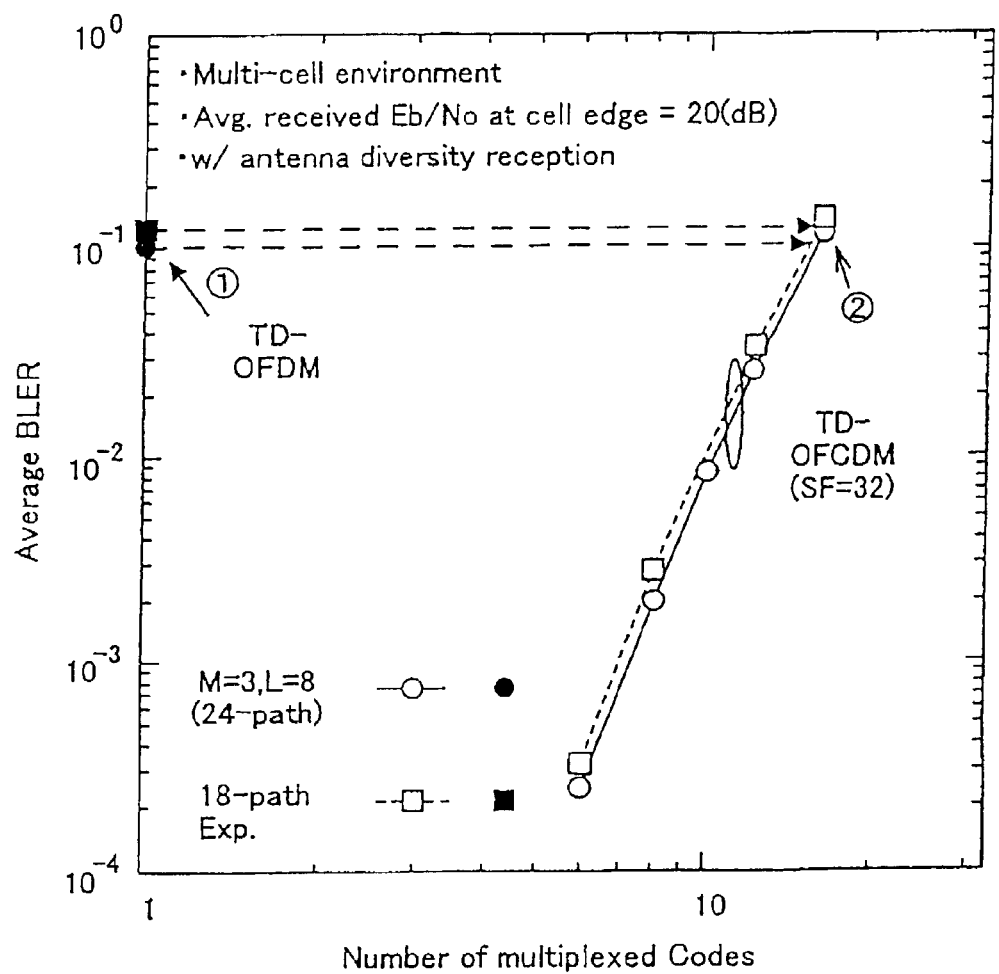
FIG. 14 is a graph showing capacity evaluation characteristics in the multi-cell environment in the variable spreading factor OFCDM of the present invention.

FIG. 14 shows the result of simulation to provide average BLER characteristics against change in the number of multiplexed codes under the multi-cell environment in the variable spreading factor OFCDM. The preconditions were that average received $E_b/N_o$ at the cell edge was 20 dB, antenna diversity reception was taken into consideration, and no control was made on transmit power.

As shown in the same figure, average BLER with SF=1 (the number of multiplexed codes is 1) is approximately $10^{-1}$ ($\hat{1}$ in FIG. 14), and the reason for it is that influence of the co-channel interference from the other cells is great in the cell frequency reuse of 3 to degrade the performance. It is seen from the same figure that the number of multiplexed codes with SF=32 satisfying the average BLER equal to that with SF=1 is about 16 ($\hat{2}$ in FIG. 14).

Let us define here the capacity per cell η by the equation below, where $R_b$ is an information transmission rate in use of the entire radio bandwidth, β an insertion loss of guard intervals and pilot symbols, F the frequency reuse, and K the number of multiplexed codes.

$$\eta = \frac{R_b}{SF} \cdot \beta \cdot \frac{1}{F} \cdot k$$

The capacity η with SF=1 ($=\eta_{OFDM}$ as a capacity per cell of OFDM) is derived as follows.

$$\eta_{OFDM} = \frac{80 \times 10^6}{1} \cdot \left(\frac{512}{512+100} \cdot \frac{60}{64}\right) \cdot \frac{1}{3} \cdot 1 = 20.9 \text{ Mbps}$$

Furthermore, the capacity η with SF=32 ($=\eta_{OFCDM}$ as a capacity per cell of OFCDM) is derived as follows.

$$\eta_{OFCDM} = \frac{80 \times 10^6}{32} \cdot \left(\frac{512}{512+100} \cdot \frac{60}{64}\right) \cdot \frac{1}{1} \cdot 16 = 31.4 \text{ Mbps}$$

This verifies that in the multi-cell environment the OFCDM is able to secure the capacity greater than the OFDM. Namely, SF is set greater than 1 to realize the frequency reuse of 1 in the OFCDM, thereby achieving the greater capacity.

As described above, the variable spreading factor OFCDM using the variable spreading factor employs SF>1 and the multiplication of scrambling codes on the frequency axis in the multi-cell environment to realize the greater capacity by the cell frequency reuse of 1, and SF=1 in the single-cell environment to realize the increase of frequency utilization efficiency.

Since the cell environments and propagation environments are used as parameters for variation of SF, the connection between different cell environments can be made seamless in the same apparatus configuration. As a result, it is feasible to cover a wide cell coverage without need for use of individual devices for the respective cell environments.

In the above examples, the serial/parallel converter 45 corresponds to the converting means, the spreading code generator 50 to the spreading means, the delay spread acquiring function of the radio transmitter/receiver 14 to the first spreading factor determining means, and the outside interface function of the controller 17 to the second spreading factor determining means. The controller 29 of the mobile station 100 corresponds to the spreading factor control receiving means and the outside interface function of the controller 29 to the spreading factor determining means of the receiver apparatus.

Although the embodiment described above was configured to estimate the variation of propagation paths at a certain moment and perform weighting on the basis thereof, it is also possible to combine information symbols two-dimensionally copied on the frequency axis and on the time axis by the copying means (Copier). By performing the weighting utilizing a plurality of frequencies and times as described, it becomes feasible to extract a more accurate received signal against variation in the time direction, i.e., against the fading variation as well.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An orthogonal frequency and code division multiplexing (OFDM) radio transmission system configured for parallelly transmitting identical information via a plurality of sub-carriers, comprising:
   a transmitter configured to transmit an OFDM signal to a receiver and including
      converting means for parallelly converting channel-coded information according to symbols transmitted simultaneously;
      spreading means for spreading a sequence of parallelized symbols in at least one of a frequency direction and a time direction by a spreading code sequence having a spreading factor determined based on a plurality of changeable spreading factors; and
      spreading factor determining means for determining said spreading factor based on a command provided by a device external to the transmitter.

2. The radio transmission system according to claim 1, wherein the spreading means spreads the sequence of parallelized symbols in both the frequency direction and the time direction.

3. The radio transmission system according to claim 1, wherein said spreading factor determining means determines a condition of a propagation path between the transmitter and the receiver and determines said spreading factor according to the condition.

4. The radio transmission system according to claim 3, wherein said spreading factor determining means obtains a delay spread and uses said delay spread as said condition.

5. The radio transmission system according to claim 1, wherein said spreading factor determining means determines said spreading factor according to one of a cell configuration and the spreading factor, included in the command from the device external to the transmitter.

6. The radio transmission system according to claim 1, wherein the spreading factor is determined to be a numerical value greater than 1 if a corresponding cell environment is a multi-cell environment, and the spreading factor is determined to be a numerical value equal to 1 if the corresponding cell environment is a single-cell environment.

7. The radio transmission system according to claim 1, wherein the spreading factor is determined based on control information representing whether a corresponding cell environment is a multi-cell environment or a single-cell environment, and the control information is transmitted from a superordinate station.

8. An orthogonal frequency and code division multiplexing (OFDM) radio transmission system configured for parallelly transmitting identical information via a plurality of sub-carriers, comprising:
   a transmitter including
      converting means for parallelly converting channel-coded information according to symbols transmitted simultaneously, and
      spreading means for spreading a sequence of parallelized symbols in at least one of a frequency direction and a time direction by a spreading code sequence having a spreading factor determined based on a plurality of changeable spreading factors; and
   a receiver including
      spreading factor control receiving means for separating a corresponding OFDM signal received at the receiver into at least one of sub-carriers and time-axial symbols and for integrating coherently said at least one of sub-carriers and time-axial symbols, the number of which being equivalent to the spreading factor by, using a channel estimation value and a specific spreading code sequence.

9. The radio transmission system according to claim 8, wherein said spreading factor control receiving means separates the received signal into both sub-carriers and time-axial symbols and integrating coherently both sub-carriers and time-axial symbols.

10. The radio transmission system according to claim 8, wherein said spreading factor control receiving means determines said spreading factor on the basis of control information included in a control signal sent from the transmitter as a communicating correspondent.

11. The radio transmission system according to claim 10, wherein said spreading factor determining means determines said spreading factor according to either information indicating a cell configuration or information designating a spreading factor, included in the control signal from the transmitter.

12. An orthogonal frequency and code division multiplexing (OFDM) radio transmission method for parallelly transmitting identical information via a plurality of sub-carriers, comprising:
    transmitting an OFDM signal from a transmitter to a receiver, including:
        parallelly converting channel-coded information according to symbols transmitted simultaneously;
        spreading a sequence of parallelized symbols in at least one of a frequency direction and a time direction by a spreading code sequence having a spreading factor determined based on a plurality of changeable spreading factors; and
        determining said spreading factor on the basis of a command from a device external to the transmitter.

13. The radio transmission method according to claim 12, the spreading further comprising:
    spreading the sequence of parallelized symbols in both the frequency direction and the time direction.

14. The radio transmission method according to claim 12, further comprising:
    determining a condition of a propagation path between the transmitter and the receiver and determining the spreading factor according to the condition.

15. The radio transmission method according to claim 14, further comprising:
    obtaining a delay spread using said delay spread as said condition.

16. The radio transmission method according to claim 12, further comprising:
    determining said spreading factor according to one of a cell configuration and the spreading factor, included in the command from outside.

17. The radio transmission method according to claim 12, wherein the spreading factor is determined to be a numerical value greater than 1 if a corresponding cell environment is a multi-cell environment, and the spreading factor is determined to be a numerical value equal to 1 if the corresponding cell environment is a single-cell environment.

18. The radio transmission method according to claim 12, wherein the spreading factor is determined based on control information representing whether a corresponding cell environment is a multi-cell environment or a single-cell environment, and the control information is transmitted from a superordinate station.

19. An orthogonal frequency and code division multiplexing (OFDM) radio transmission method for parallelly transmitting identical information via a plurality of sub-carriers, comprising:
    transmitting an OFDM signal:
        parallelly converting channel-coded information according to symbols transmitted simultaneously, and
        spreading a sequence of parallelized symbols in at least one of a frequency direction and a time direction by a spreading code sequence having a spreading factor determined based on a plurality of changeable spreading factors; and
    receiving the OFDM signal, including separating the received OFDM signal into at least one of sub-carriers and time-axial symbols, and integrating coherently the at least one of sub-carriers and time-axial symbols the number of which is equivalent to the spreading factor by, using a channel estimation value and a specific spreading code sequence.

20. The radio transmission method according to claim 19, further comprising:
    separating the received OFDM signal into both sub-carriers and time-axial symbols and integrating coherently both sub-carriers and time-axial symbols the number of which is equivalent to the spreading factor determined based on the plurality of changeable spreading factors, using a channel estimation value and a specific spreading code sequence.

21. The radio transmission method according to claim 19, further comprising:
    determining said spreading factor on the basis of control information included in a control signal sent from the transmitter as a communicating correspondent.

22. The radio transmission method according to claim 21, further comprising:
    determining said spreading factor according to either information indicating a cell configuration or information designating a spreading factor, included in the control signal from the transmitter.

23. An orthogonal frequency and code division multiplexing (OFDM) transmitter configured for parallelly transmitting identical information via a plurality of sub-carriers, comprising:
    converting means for parallelly converting channel-coded information according to symbols transmitted simultaneously;
    spreading means for spreading a sequence of parallelized symbols in at least one of a frequency direction and a time direction by a spreading code sequence having a spreading factor determined based on a plurality of changeable spreading factors; and
    spreading factor determining means for determining said spreading factor on the basis of a command from a device external to the transmitter.

24. The transmitter apparatus according to claim 23, wherein the spreading means spreads the sequence of parallelized symbols in both the frequency direction and the time direction.

25. The transmitter apparatus according to claim 23, the spreading factor determining means further comprises:
    means for determining a condition of a propagation path between the transmitter and the receiver and determining the spreading factor according to the condition.

26. The transmitter apparatus according to claim 25, wherein said spreading factor determining means includes means for obtaining a delay spread and using said delay spread as said condition.

27. The transmitter apparatus according to claim 23, wherein said spreading factor determining means includes means for determining said spreading factor according to one of a cell configuration and the spreading factor, included in the command from outside.

28. The transmitter apparatus according to claim 23, wherein the spreading factor is determined to be a numerical value greater than 1 if a corresponding cell environment is a multi-cell environment, and the spreading factor is determined to be a numerical value equal to 1 if the corresponding cell environment is a single-cell environment.

29. The transmitter apparatus according to claim 23, wherein the spreading factor is determined based on control information representing whether a corresponding cell environment is a multi-cell environment or a single-cell environment, and the control information is transmitted from a superordinate station.

30. A receiver apparatus configured to receive a signal radio-transmitted using an orthogonal frequency and code division multiplexing transmission scheme from a transmitter apparatus, said receiver apparatus comprising:

spreading factor control receiving means for separating the receive signal received at the receiver, into at least one of sub-carriers and time-axial symbols and integrating coherently at least one of sub-carriers and time-axial symbols the number of which is equivalent to a first spreading factor determined based on a plurality of changeable spreading factors, using a channel estimation value and a specific spreading code sequence.

31. The receiver apparatus according to claim 30, wherein said spreading factor control receiving means for separating the receive signal received at the receiver, into both sub-carriers and time-axial symbols and integrating coherently both sub-carriers and time-axial symbols the number of which is equivalent to a first spreading factor determined based on a plurality of changeable spreading factors, using a channel estimation value and a specific spreading code sequence.

32. The receiver apparatus according to claim 30, wherein said spreading factor control receiving means comprises spreading factor determining means for determining said first spreading factor on the basis of control information included in a control signal sent from the transmitter as a communicating correspondent.

33. The receiver apparatus according to claim 32, wherein said spreading factor determining means determines said first spreading factor according to either information indicating a cell configuration or information designating a spreading factor, included in the control signal from the transmitter.

34. The receiver apparatus according to claim 30, wherein the spreading factor is determined to be a numerical value greater than 1 if a corresponding cell environment is a multi-cell environment, and the spreading factor is determined to be a numerical value equal to 1 if the corresponding cell environment is a single-cell environment.

35. The receiver apparatus according to claim 30, wherein the spreading factor is determined based on control information representing whether a corresponding cell environment is a multi-cell environment or a single-cell environment, and the control information is transmitted from a superordinate station.

* * * * *